United States Patent
Nishikawa et al.

(10) Patent No.: US 10,838,949 B2
(45) Date of Patent: Nov. 17, 2020

(54) SHARED RESOURCE UPDATE APPARATUS AND SHARED RESOURCE UPDATE METHOD

(71) Applicant: HITACHI, LTD., Tokyo (JP)

(72) Inventors: Norifumi Nishikawa, Tokyo (JP); Tomohiro Hanai, Tokyo (JP); Akira Shimizu, Tokyo (JP); Kazuhiko Mogi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 599 days.

(21) Appl. No.: 15/557,836

(22) PCT Filed: Apr. 2, 2015

(86) PCT No.: PCT/JP2015/060433
§ 371 (c)(1),
(2) Date: Sep. 13, 2017

(87) PCT Pub. No.: WO2016/157492
PCT Pub. Date: Oct. 6, 2016

(65) Prior Publication Data
US 2018/0046664 A1    Feb. 15, 2018

(51) Int. Cl.
*G06F 16/23* (2019.01)
*G06F 9/52* (2006.01)
(Continued)

(52) U.S. Cl.
CPC ........ *G06F 16/2372* (2019.01); *G06F 9/5055* (2013.01); *G06F 9/52* (2013.01);
(Continued)

(58) Field of Classification Search
None
See application file for complete search history.

(56) References Cited

U.S. PATENT DOCUMENTS

| 5,600,596 A | 2/1997 | Shirakihara |
| 5,715,447 A | 2/1998 | Hayashi et al. |

(Continued)

FOREIGN PATENT DOCUMENTS

| JP | 07-200376 A | 8/1995 |
| JP | 07-200390 A | 8/1995 |

(Continued)

OTHER PUBLICATIONS

International Search Report for WO 2016/157492 A1, dated Jul. 7, 2015.

*Primary Examiner* — Amresh Singh
(74) *Attorney, Agent, or Firm* — Volpe Koenig

(57) ABSTRACT

A shared resource update apparatus includes: a processor unit including at least one processor having a plurality of processor cores that respectively execute a plurality of threads; and a storage unit storing a program that executes conflict avoidance control by being executed by the processor unit. A shared resource for the plurality of threads comprises a plurality of shared resource parts which are logically or physically partitioned. Each first thread among the plurality of threads is an update thread which updates an allocated shared resource part in response to an update request. Each second thread among the plurality of threads is a reference thread which issues an update request and references a shared resource part. Conflict avoidance control includes allocation of different shared resource parts to different update threads at a ratio of 1:n or 1:1, where n is an integer equal to or larger than 2.

13 Claims, 19 Drawing Sheets

(51) Int. Cl.
*G06F 12/00* (2006.01)
*G06F 9/50* (2006.01)

(52) U.S. Cl.
CPC .............. *G06F 12/00* (2013.01); *G06F 16/23* (2019.01); *G06F 16/235* (2019.01); *G06F 16/2358* (2019.01)

(56) References Cited

U.S. PATENT DOCUMENTS

| | | |
|---|---|---|
| 2002/0107878 A1 | 8/2002 | Tsuchida et al. |
| 2006/0143429 A1 | 6/2006 | Nishiyama et al. |
| 2013/0125131 A1 | 5/2013 | Yamashita et al. |

FOREIGN PATENT DOCUMENTS

| | | |
|---|---|---|
| JP | 3107094 B2 | 11/2000 |
| JP | 2002-157156 A | 5/2002 |
| JP | 2002-318717 A | 10/2002 |
| JP | 2006-185232 A | 7/2006 |
| JP | 2007-086951 A | 4/2007 |
| JP | 2008-046700 A | 2/2008 |
| JP | 5321748 B2 | 10/2013 |

FIG. 6

DB area management table
501

| # | DB file name | Largest used page # | Largest page # |
|---|---|---|---|
| 1 | 6a | 120 | 3000 |
| 2 | 6b | 150 | 6000 |
| ... | ... | ... | ... |

FIG. 7

VOL template table
505

| # | DB file name | DB area # | Start page # | End page # |
|---|---|---|---|---|
| 1 | 6a | Aa1 | 1 | 1000 |
| 2 | 6a | Aa2 | 1001 | 2000 |
| ... | ... | ... | ... | ... |
| n | 6b | Ab1 | 3001 | 4000 |
| ... | ... | ... | ... | ... |

FIG. 8

Thread management table
502

| core # | OS thread # | Pseudo thread # | Type | Log buffer name | Log file name | DB file name | DB area # |
|---|---|---|---|---|---|---|---|
| C11 | T11a | U11a1 | Reference | | | 6a | 1 |
| C11 | T11a | U11a2 | Reference | | | 6a | 2 |
| C11 | T11a | U11a3 | Reference | | | 6a | 3 |
| C11 | T11a | U11a4 | Update | B14a | 7a | | |
| C21 | T11b | U11b1 | Reference | | | 6b | 1 |
| C21 | T11b | U11b2 | Reference | | | 6b | 2 |
| C21 | T11b | U11b3 | Reference | | | 6b | 3 |
| C21 | T11b | U11b4 | Update | B14b | 7b | | |
| C31 | T11c | U11c1 | Reference | | | 6c | 1 |
| C31 | T11c | U11c2 | Reference | | | 6c | 2 |
| C31 | T11c | U11c3 | Reference | | | 6c | 3 |
| C31 | T11c | U11c4 | Update | B14c | 7c | | |
| C41 | T11d | U11d1 | Reference | | | 6d | 1 |
| C41 | T11d | U11d2 | Reference | | | 6d | 2 |
| C41 | T11d | U11d3 | Reference | | | 6d | 3 |
| C41 | T11d | U11d4 | Update | B14d | 7d | | |
| ... | ... | ... | ... | ... | ... | ... | ... |

FIG. 9

Inter-thread data passing queue
503

| From Thread # | To Thread # | Record value |
|---|---|---|
| U11a1 | U11a4 | xxxx |
| U11a2 | U11b4 | yyyy |
| U11a3 | U11c4 | zzzz |
| U11a4 | U11a4 | aaaa |
| U11b1 | U11a4 | bbbb |
| U11b2 | U11b4 | cccc |
| U11b3 | U11c4 | dddd |
| U11b4 | U11a4 | eeee |
| : | : | : |
|  |  |  |

FIG. 10

Log file management table
506

| # | Log file name | State |
|---|---|---|
| 1 | 7a | In use |
| 2 | 7b | In use |
| 3 | 7c | Unused |
| ... | ... | ... |

FIG. 23

Management screen

Thread/log correspondence relationship

| Thread # | Log file # |
|---|---|
| T11a | 7a |
| T11b | 7b |
| T11c | 7c |
| T11d | 7d |
| ... | ... |

FIG. 24

Management screen

Output throughput to log file

| Thread # | Log file # | Output throughput (MB/sec) |
|---|---|---|
| T11a | 7a | 100 |
| T11b | 7b | 98 |
| T11c | 7c | 101 |
| T11d | 7d | 99 |
| ... | ... | ... |

SHARED RESOURCE UPDATE APPARATUS AND SHARED RESOURCE UPDATE METHOD

TECHNICAL FIELD

This invention generally relates to updating of a shared resource.

BACKGROUND ART

For example, a multi-core processor system configured to execute processing in parallel by a plurality of processor cores (hereinafter sometimes simply referred to as a "core") is known. In the multi-core processor system, a plurality of threads share a resource such as a database.

When an access conflict for the shared resource occurs between the plurality of threads, the threads are suspended in accordance with the order of priority of the threads and the thread order is scheduled so that the access conflict does not occur.

For example, in PTL 1, a technology of avoiding the access conflict by changing the time points allocated to the cores corresponding to the threads when a state in which the plurality of threads are accessing the same resource is detected is disclosed.

CITATION LIST

Patent Literature

[PTL 1]
Japanese Patent No. 5321748

SUMMARY OF INVENTION

Technical Problem

In PTL 1, the time points of the plurality of threads are adjusted so as not to overlap with each other in order to avoid the access conflict between the plurality of threads. As a result, the plurality of threads sometimes cannot be executed in parallel even when a plurality of cores are installed.

Solution to Problem

A shared resource update apparatus comprises: a processor unit which includes at least one processor having a plurality of processor cores that respectively execute a plurality of threads; and a storage unit which stores a program that executes conflict avoidance control by being executed by the processor unit. A shared resource for the plurality of threads comprises a plurality of shared resource parts which are logically or physically partitioned. Each of two or more first threads among the plurality of threads is an update thread which updates an allocated shared resource part in response to an update request. Each of two or more second threads among the plurality of threads is a reference thread which issues an update request and references a shared resource part. The conflict avoidance control includes the allocation of different shared resource parts to different update threads at a ratio of 1:n or 1:1 (where n is an integer equal to or larger than 2). The expression of "thread" here can mean an OS thread or a pseudo thread described later.

Advantageous Effects of Invention

Different shared resource parts are allocated to different update threads at a ratio of 1:n or 1:1. As a result, for each shared resource part, the number of the update threads allocated to the shared resource part is one. That is, the same shared resource part is not allocated to two or more update threads. Therefore, the access conflict for the same shared resource part does not occur even if the plurality of update threads are executed in parallel.

BRIEF DESCRIPTION OF DRAWINGS

FIG. 6 illustrates a configuration example of a database (DB) file management table.

FIG. 7 illustrates a configuration example of a DB area-page correspondence management table.

FIG. 8 illustrates a configuration example of a thread management table.

FIG. 9 illustrates a configuration example of an inter-thread data passing queue.

FIG. 10 illustrates a configuration example of a log file management table.

FIG. 23 illustrates an example of a management screen.

FIG. 24 illustrates an example of the management screen.

DESCRIPTION OF EMBODIMENTS

An embodiment is described below.

In the below description, information is sometimes described with use of the expression of a "kkk management table" or a "kkk queue", but the information can be described with data configurations other than a table. In order to indicate that the information is independent of the data configuration, at least one of the "kkk management table" and the "kkk queue" can be referred to as "kkk information". The configuration of each table is an example and two or more tables can be put together to one table or one table can be separated into a plurality of tables.

In the below description, a number or a name is used as identification information of an element, but other types of identification information can be used instead or in addition to the number or the name.

In the below description, a reference symbol (or a common symbol in the reference symbol) is sometimes used when same types of elements are described without distinction and element identification information (identification information such as the number, the name, or the like allocated to the element) (or the reference symbol) is sometimes used when same types of elements are described with distinction.

In the below description, processing is sometimes described with a "program" being the subject thereof. However, the program performs determined processing with use of a storage unit (for example, a memory), an interface device (for example, a communication port), and/or the like as appropriate by being executed by a processor (for example, a CPU (Central Processing Unit)), and hence the subject of the processing can be the processor. The processing described with the program being the subject can be processing performed by the processor or an apparatus or a system including the processor. The processor can include a hardware circuit configured to perform a part of or all of the processing. The program can be installed on an apparatus such as a computer from a program source. The program source can be, for example, a program distribution server or a storage media readable by the computer. When the program source is a program distribution server, the program distribution server can include a processor (for example, a CPU) and a storage unit, and the storage unit can further store therein a distribution program and a program that is a distribution target. The processor of the program distribution server can distribute the program that is the distribution target to other computers when the processor of the program distribution server executes the distribution program. In the below description, two or more programs can be realized as one program or one program can be realized as two or more programs.

In the below description, an "OS thread" is a thread managed by an OS (Operating System) (for example, a thread managed by a kernel and a library) and can be referred to as a real thread. A "pseudo thread" is a thread managed by a database management program.

Figure 1:
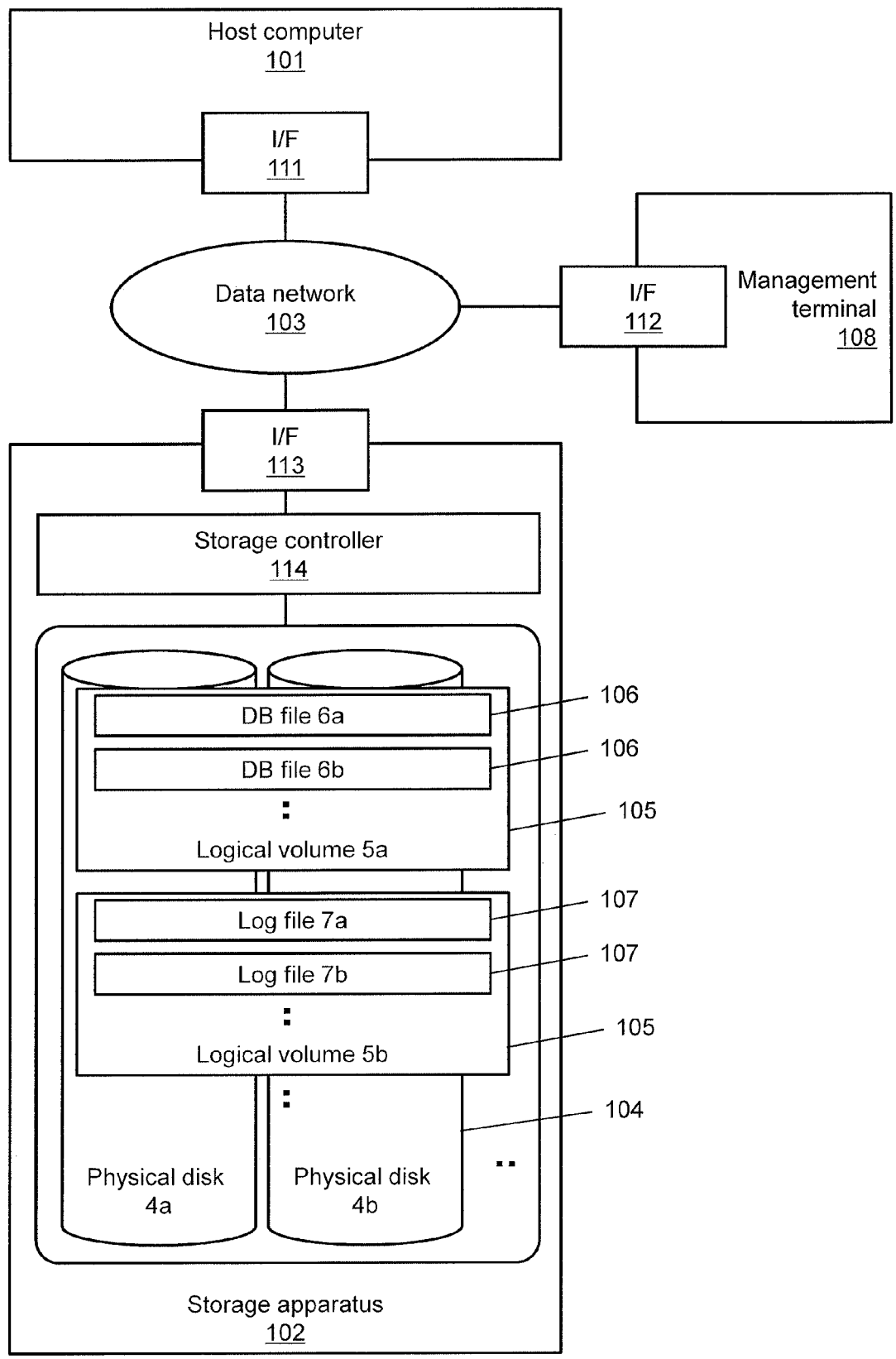
FIG. 1 illustrates a configuration example of a shared resource update system according to an embodiment.

FIG. 1 illustrates a configuration example of a shared resource update system according to an embodiment.

The shared resource update system includes a host computer 101, a storage apparatus 102, and a management terminal 108. The host computer 101, the storage apparatus 102, and the management terminal 108 are coupled to each other over a communication network (for example, a SAN (Storage Area Network) or a LAN (Local Area Network)) 103. In FIG. 1, one apparatus is coupled to the communication network 103 for one connection, but this invention is not limited to this example, and a plurality of apparatuses can be coupled to the communication network 103. A client terminal (not shown) to be used by a user using a business system and the like may be coupled to the communication network 103.

The host computer 101 is a computer including information processing resources such as a CPU (Central Processing Unit) and a memory, and is formed of a personal computer, a workstation, and a mainframe, for example. The CPU is an example of a processor and functions as an operation processing unit. The CPU controls the operation of the host computer 101 in accordance with a program, an operation parameter, and the like stored in the memory. The host computer 101 is an example of a shared resource update apparatus. The host computer 101 may include input devices such as a keyboard, a switch, a pointing device, and a microphone and output devices such as a display device (for example, a monitor display) and a speaker.

The host computer 101 uses a multi-core processor system in which a plurality of CPUs (an example of a processor unit) each accommodate a plurality of CPU cores (cores) so that performance is enhanced through parallel processing. In the multi-core processor system, resources are shared among the plurality of cores mounted on the CPU, and a plurality of threads are processed in parallel.

The host computer 101 is coupled to the communication network 103 via an I/F 111. The I/F 111 is an interface device configured to control input and output of data between the host computer 101 and external apparatuses via the communication network 103, and is an HBA (Host Bus Adapter) or a LAN adapter, for example.

The storage apparatus 102 includes a plurality of (or one) physical disks 104 and a storage controller 114 configured to control the I/O (Input/Output) for the physical disk 104. The storage controller 114 is configured to interpret a command from the host computer 101 and execute write or read (I/O) to a storage area in the storage apparatus 102. The storage area provided by the storage apparatus 102 is formed of the plurality of (or one) physical disks 104. The physical disk 104 is an example of a physical nonvolatile storage device and is an HDD (Hard Disk Drive) or an SSD (Solid State Drive), for example.

The storage apparatus 102 is configured to define a plurality of (or one) logical volumes 105 on the storage area formed of the plurality of physical disks 104. The logical volume 105 may be a virtual logical volume 105 using Thin Provisioning instead of the logical volume 105 formed of the plurality of physical disks 104. A database file (hereinafter referred to as a DB file) 106, a log file 107, and the like are stored in the logical volume 105.

The storage apparatus 102 is coupled to the communication network 103 via an I/F 113. The I/F 113 is an interface device configured to control input and output of data between the storage apparatus 102 and external apparatuses via the communication network 103, and is an HBA or a LAN adapter, for example.

The management terminal 108 is a computer including information processing resources such as a CPU and a memory and is a computer configured to manage the host computer 101 and the storage apparatus 102 in accordance with the input from an operator and the like. The management terminal 108 includes input devices such as a keyboard, a switch, a pointing device, and a microphone and output devices such as a display device (for example, a monitor display) and a speaker.

The management terminal 108 is coupled to the communication network 103 via an I/F 112. The I/F 112 is an interface device configured to control input and output of data between the management terminal 108 and external apparatuses via the communication network 103, and is a LAN adapter, for example.

A database is stored in the plurality of (or one) logical volumes 105 and the database includes the plurality of DB files 106. The database may include one or more tables (hereinafter referred to as DB tables), for example, and may further include one or more indexes, for example. The DB table is a set of one or more records, and the record is formed of one or more columns. The index is a data structure created for one or more columns and the like of the DB table as the target, and speeds up the access to the DB table by selective conditions including the column and the like that is the target of the index. For example, the DB table is a data structure for holding information for specifying, for each value in a target column, a record including the value in the DB table. For example, a B-tree is used as the data structure. A physical address, a logical row ID, and the like may be used as the information for specifying the record.

Figure 2:
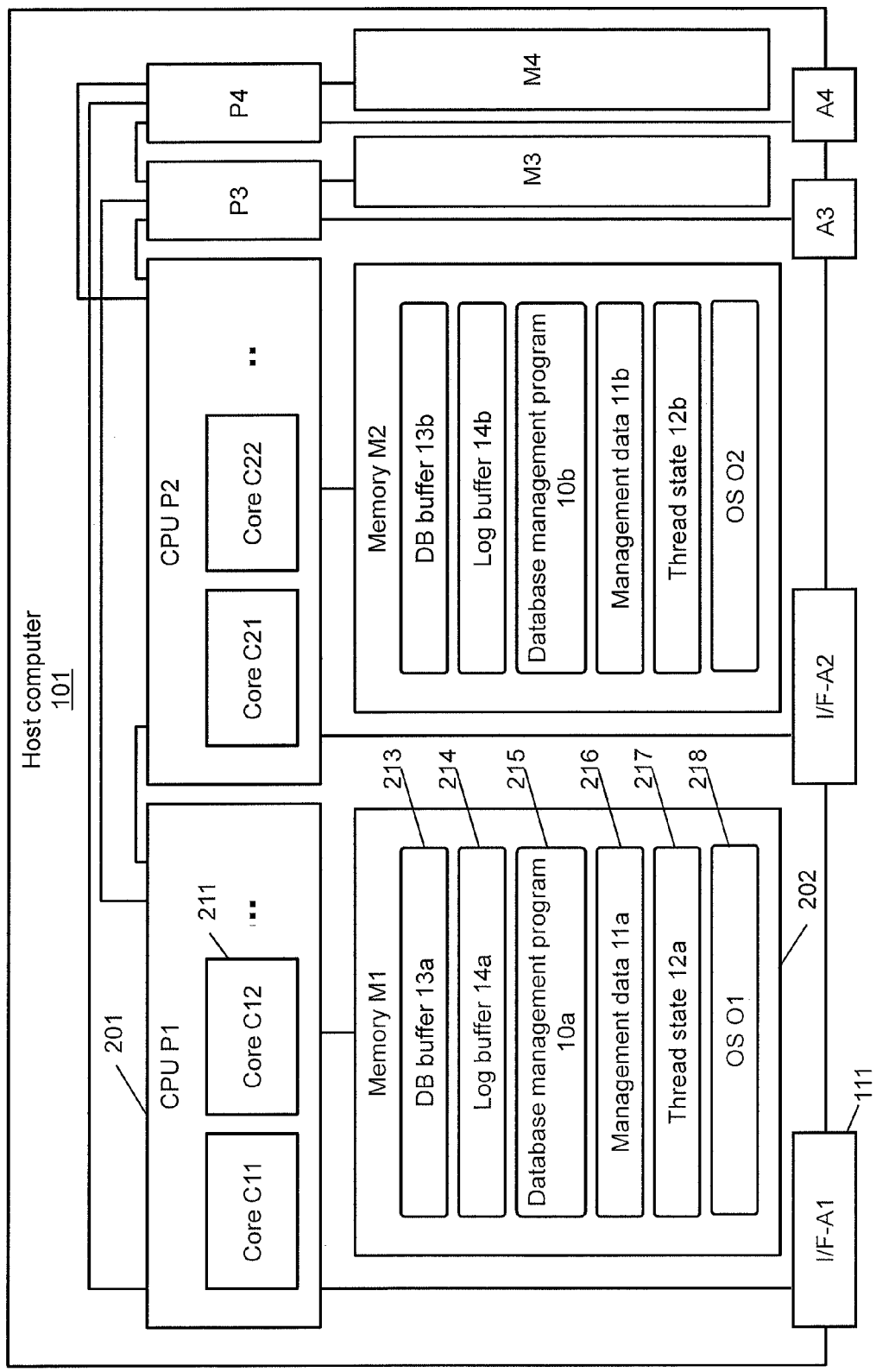
FIG. 2 illustrates a configuration example of a host computer.

FIG. 2 illustrates a configuration example of the host computer 101.

The host computer 101 includes a plurality of CPUs 201 (for example, CPUs P1, P2, P3, and P4) and a plurality of memories 202 (for example, memories M1, M2, M3, and M4). The plurality of CPUs 201 are associated with the plurality of memories 202, respectively. The numbers of the CPUs 201 and the memories 202 may be one. One or more memories 202 are an example of the storage unit.

The CPU 201 is coupled to a corresponding memory 202 by a bus and the like. The CPU 201 is configured to execute various kinds of programs stored in the corresponding memory 202, and store changing parameters into the memory 202 and temporarily store various kinds of data to be stored in the storage apparatus 102 into the memory 202 as appropriate.

A plurality of cores 211 are mounted on each CPU 201. Each CPU 201 activates the plurality of cores 211 in parallel to process a plurality of threads in parallel. Each of the CPUs P1 to P4 transmits and receives data to and from the storage apparatus 102 coupled to the communication network 103 via one of I/F-A1 to I/F-A4.

A DB buffer 213, a log buffer 214, a database management program 215, management data 216, a thread state 217, an OS (Operating System) 218, and the like are stored in the memory M1. The memories M2 to M4 have configurations similar to that of the memory M1. Thus, the memory M1 is described as an example.

The DB buffer 213 is an area in which data to be written in the DB file 106 in the storage apparatus 102 is temporarily stored. The log buffer 214 is an area in which data to be written in the log file 107 in the storage apparatus 102 is temporarily stored.

The database management program 215 is a so-called database management system (DBMS) and is a program that controls search processing and update processing for the database (DB file 106). The database management program 215 is described later.

The management data 216 is information used for the database management program 215 to manage a database area (DB area), a log area, a thread, and the like. The management data 216 is described later. The DB area may be at least a part of one or more DB files 106 and is a set of one or more pages (logical areas). The log area may be at least a part of one or more log files 107. In this embodiment, data is input and output for the DB area in units of pages. The page as the component of the DB area is hereinafter sometimes referred to as a "DB page".

The thread state 217 is information for showing the state of the thread executed by each core 211.

Figure 3:
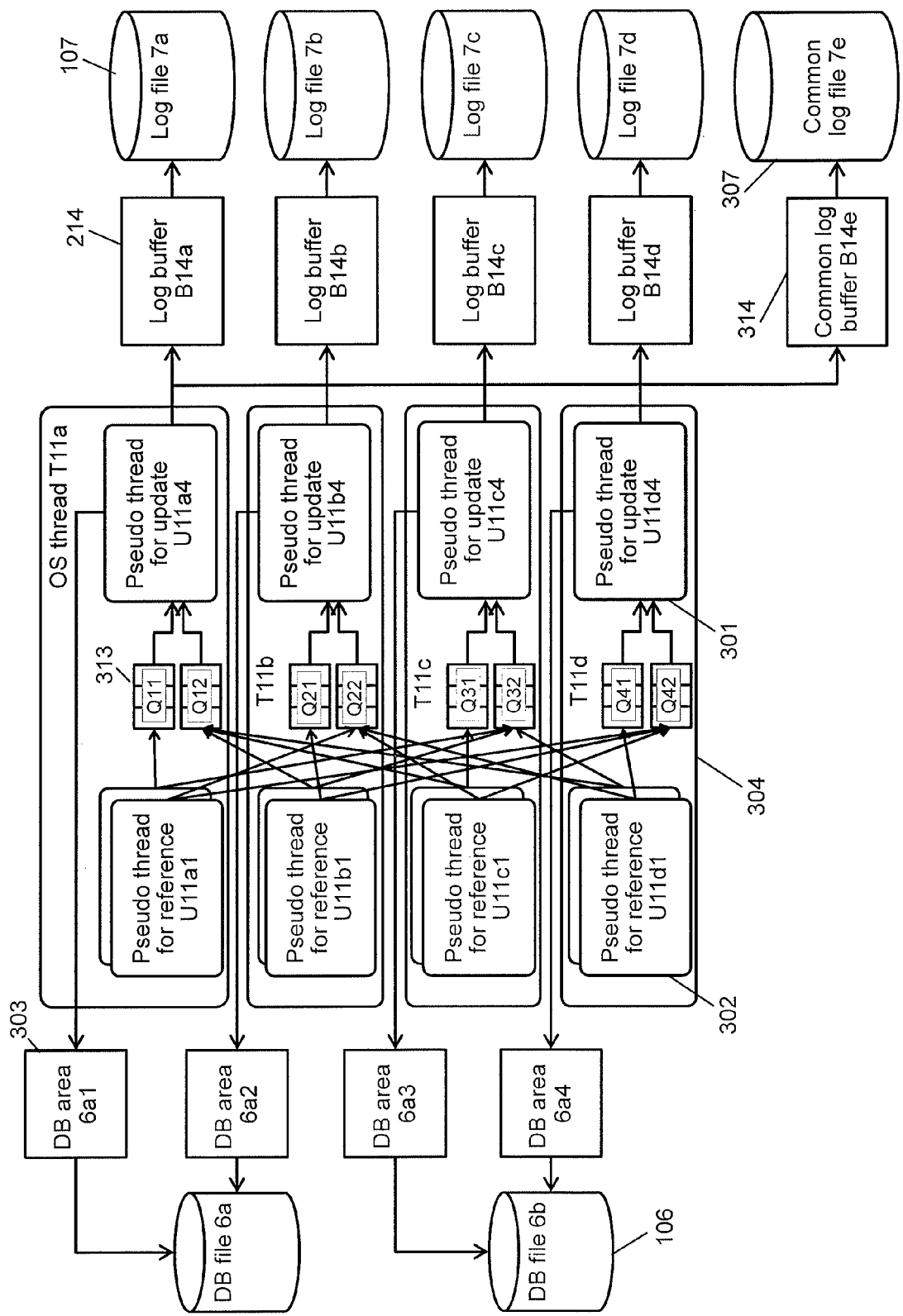
FIG. 3 illustrates an example of shared resource allocation in accordance with a first allocation mode.

FIG. 3 illustrates an example of shared resource allocation in accordance with a first allocation mode. The example illustrated in FIG. 3 is based on a thread state 12a and management data 11a in the memory M1.

Each of DB files 6a and 6b is formed of a plurality of DB areas 303. Each DB area 303 is formed of a plurality of DB pages. Although not shown, each log file 107 can be formed of a plurality of log areas. However, each log area may not necessarily be logically separated into a plurality of pages. This is because the log generally has a variable length (sequential I/O is mainly performed), and hence inputting and outputting in units of pages is not as significant for the log as for at least the database. There is a common log file 307 in addition to the plurality of log files 107. A physical log is stored in the common log file 307. A logical log is stored in each log file 107. The physical log is a log including actual data to be stored in the database and includes a page number (for example, an address) of the update target and the page before the update (the image before the update), for example. The logical log is a log including information for showing the operation for the database management program 215 and includes the operation type (for example, insertion and reference), the data ID, and the key value, for example. In this embodiment, it is not necessary to include updated information in neither of the physical log nor the logical log because the DB data at the time of the commit is written into the DB page at the time of the commit. However, this is not always necessary and both the physical log and the logical log can include updated information. For example, the physical log can include an updated page (updated image).

A case in which the CPU P1 includes four cores C11 to C14 is described. One core 211 can execute one OS thread 304. As a result, four OS threads T11a, T11b, T11c, and T11d can be executed in parallel by four cores C11 to C14.

Each OS thread 304 is simulatively subdivided by the database management program 215 and includes a plurality of pseudo threads. The plurality of pseudo threads include a plurality of (or one) pseudo threads for reference (hereinafter referred to as reference threads) 302 and one (or a plurality of) pseudo thread for update (hereinafter referred to as an update thread) 301. The passing of the request between the reference thread 302 and the update thread 301 is performed via a queue 313. A plurality of (or one) queues 313 are prepared for one update thread 301. The number of the queues 313 prepared for one update thread 301 can be the same as the number of the reference threads 302 in the OS thread 304 including the update thread 301. The reference thread 302 is a pseudo thread for performing issuing of the update request and referencing to a shared resource part. For example, the reference thread 302 queries the database management program 215 about the update thread 301 corresponding to the shared resource part of the update target (or the queue 313 corresponding to the update thread 301) and issues the update request to the queue 313 determined on the basis of a reply thereof. The reference thread 302 can be a pseudo thread for search (search thread), for example. The update thread 301 updates the allocated shared resource part in response to the update request. The update thread 301 processes the update request taken out from the queue 313 corresponding to the update thread 301, for example.

The shared resource of the plurality of OS threads 304 include a plurality of shared resource parts that are logically or physically partitioned. The shared resource is at least a DB area group (the plurality of DB areas) out of the DB area group, a log buffer group (the plurality of log buffers 214), and a log file group (the plurality of log files 107), for example.

The shared resource parts is allocated to the update threads 301 by the database management program 215 at a ratio of 1:n or 1:1 (n is an integer equal to or larger than 2). The update thread 301 can access the allocated shared resource parts but cannot access the unallocated shared resource parts. Specifically, the DB areas 303 are allocated to the update threads 301 at a ratio of 1:n. That is, the plurality of DB areas 303, that is, a number of n DB areas 303 can be allocated to each update thread 301, but a number of n update threads 301 cannot be allocated to each DB area 303. As a result, the conflict between the updates from the plurality of update threads 301 to the DB area 303 can be avoided. The log buffer 214 and the log file 107 are each allocated at a ratio of 1:1 (or 1:n) to each update thread 301. That is, one log buffer 214 and one log file 107 can be allocated to each update thread 301, but the plurality of update threads 301 cannot be allocated to each log buffer 214 and each log file 107, respectively. As a result, even if the plurality of update threads 301 are executed in parallel, the conflict between the updates from the plurality of update threads 301 to the log buffer 214 and the log file 107 can be avoided. The common log file 307 and the common log buffer 314 are allocated to all the update threads 301. That is, any of the update threads 301 can update the common log file 307 and the common log buffer 314.

The execution of the reference thread 302 and the update thread 301 is as followings, for example. A case of executing an OS thread T11a is described. In that case, a plurality of reference threads U11a1, . . . and one update thread U11a4 are executed. Specifically, for example, a case in which an OS O1 (see FIG. 2) instructs the core C11 to update a certain area of the DB file 106 or the log file 107 is described. In that case, one of the plurality of reference threads U11a1, . . . searches the update target page and queries a database management program 10a (see FIG. 2) about the update thread 301 allocated to the DB area including the found page (or the queue 313 corresponding to the update thread 301), to thereby issue the update request to the queue 313 determined on a basis of a reply thereof. A case in which an update thread U11b4 is found and the update request is stored into a queue Q22 is described here. In response to the update request taken out from the queue Q22, the update thread U11b4 updates the update target page determined by the update request. At that time, the update thread 301 writes the physical log (for example, the number of the update target page and the page before the update that is the update target) to a common log buffer B14e and writes the physical log from the common log buffer B14e into a common log file 7e. The update thread U11b4 writes the logical log corresponding to the update to a log buffer B14d allocated to the update thread U11b4 and writes the logical log from the log buffer B14d into a log file 7b allocated to the update thread U11b4. Exclusive control can be performed for at least one of the common log buffer 314 and the common log file 307. For example, the update thread U11b4 can acquire a lock of the common log buffer B14e when the physical log is written into the common log buffer B14e, and can release the lock after the physical log is written.

In this embodiment, the unit of allocation for the update thread 301 is preferred to be units of DB areas than units of DB files for the database. This is because when the unit of allocation is a range relatively large in size such as the DB file, the possibility of a plurality of update targets being included in that range increases, thereby increasing the possibility that a plurality of updates cannot be executed in parallel. Another reason is because the CPU cores 211 to which the update threads 301 are not allocated remain when the number of the DB files 106 are smaller than the number of the CPU cores 211.

In this embodiment, for the database, the unit of allocation for the update thread 301 is preferred to be units of DB areas than units of DB pages. This is because, when the unit of allocation is a range relatively small in size such as the DB page, the space in the range is completely utilized, which relatively increases the frequency of the occurrence of reallocation.

In this embodiment, for the log (especially, the logical log), the unit of allocation for the update thread 301 is preferred to be units of log areas than units of log files. This is because the units of log files are the largest unit of allocation for the log. As a result, the frequency of reallocation can be reduced to the lowest degree. Further, in general, the update of the log is mainly performed by the sequential write, and hence the possibility of the plurality of dispersed update targets being in the same log file 107 is reduced.

As described above, the unit of allocation for the update thread 301 is preferred to be units of DB areas and units of log files, but is not limited thereto. The allocation can be performed in units of DB pages or units of DB files or the allocation can be performed in units of log areas.

Next, the details of the database management program 215 and the management data 216 are described.

Figure 4:
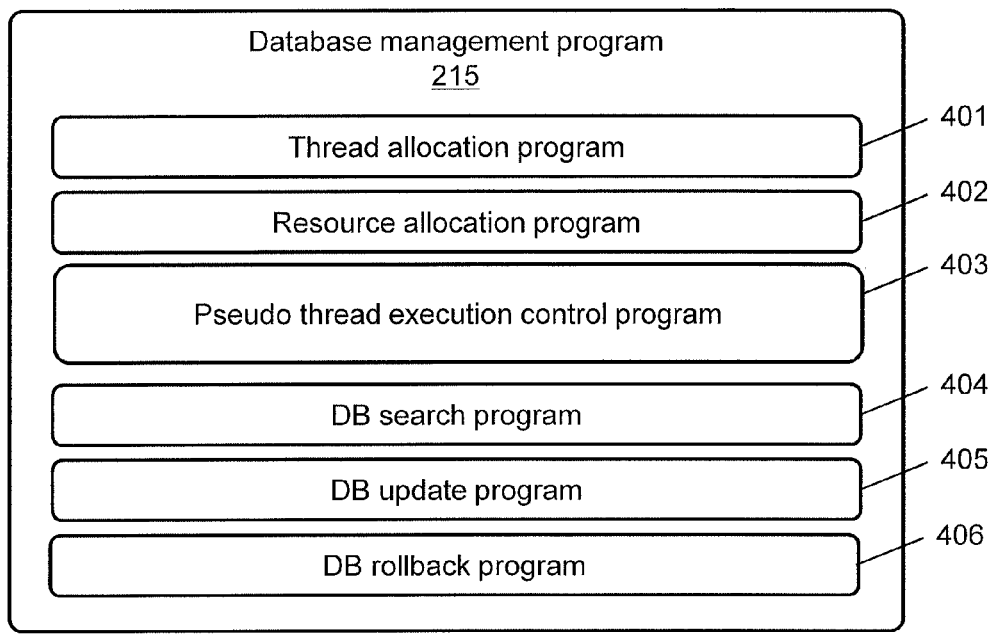
FIG. 4 illustrates a configuration example of a database management program.

FIG. 4 illustrates a configuration example of the database management program 215.

The database management program 215 includes a thread allocation program 401, a resource allocation program 402, a pseudo thread execution control program 403, a DB search program 404, a DB update program 405, and a DB rollback program 406.

The thread allocation program 401 is a program that allocates the OS threads 304 to the plurality of CPUs 201 (cores 211) on the basis of a query execution definition of a SQL (Structured Query Language) and the like and generates the plurality of pseudo threads in each OS thread 304. The association of the core 211, the OS thread 304, and the pseudo thread is managed in a thread management table 502 described later.

The resource allocation program 402 is a program that allocates the shared resource part such as the DB area 303 to the generated update thread 301. The association of the pseudo thread and the shared resource part is also managed in the thread management table 502.

The pseudo thread execution control program 403 is a program that controls which update thread 301 to execute on the basis of the passed queue of the data between the reference thread 302 and the update thread 301.

The DB search program 404 is a program that executes one reference thread 302 of the plurality of reference threads 302 and acquires a record of the search target from the DB area 303 that has been allocated to each reference thread 302.

The DB update program 405 is a program that executes the update thread 301 on the basis of information provided from the reference thread 302 and updates the allocated area of the database.

The DB rollback program 406 is a program that controls rollback.

Figure 5:
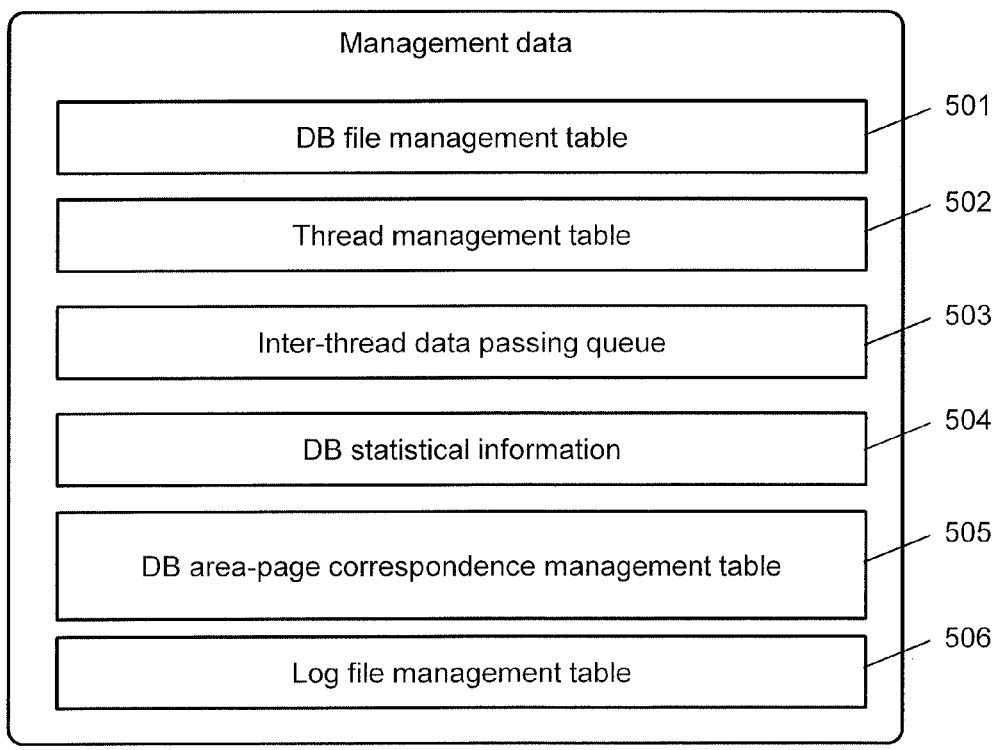
FIG. 5 illustrates a configuration example of management data.

FIG. 5 illustrates a configuration example of the management data 216.

The management data 216 includes a DB file management table 501, a thread management table 502, an inter-thread data passing queue 503, DB statistical information 504, a DB area-page correspondence management table 505, and a log file management table 506. The DB statistical information 504 can include, for example, information for showing the configuration of the index, information for showing the number of entries of the index, information for showing the number of records of the DB table, and information on the data included in the database such as the maximum value, the average value and the minimum value of the values for each column, and the value distribution for the columns.

FIG. 6 illustrates a configuration example of the DB file management table 501.

The DB file management table 501 holds information on the DB file 106. For example, the DB file management table 501 includes an entry for each DB file 106. Each entry stores a DB file name 601, a largest used page number 602, and a largest page number 603 therein.

The DB file name 601 shows the name of the DB file 106. The largest used page number 602 shows the largest page number out of the page numbers respectively corresponding to the pages in which the data of the DB file 106 is actually stored. The largest page number 603 shows the largest page number out of the plurality of page numbers respectively corresponding to the plurality of pages in which the DB file 106 can be stored.

In the example of FIG. 6, the DB file 6a has a size of 3000 pages at most and the data of the DB file 6a is stored up to the 120-th pace thereof.

FIG. 7 illustrates a configuration example of a DB area-page correspondence management table 505.

The DB area-page correspondence management table 505 shows the correspondence relationship of the DB file 106, the DB area 303, and the DB page. For example, the DB area-page correspondence management table 505 includes an entry for each DB area 303. Each entry stores a DB file name 701, a DB area number 702, a start page number 703, and an end page number 704 therein.

The DB file name 701 shows the name of the DB file 106 to be stored in the DB area 303. The DB area number 702 shows the number of the DB area 303. The start the page number 703 shows the number of the first page out of out of the plurality of successive pages forming the DB area 303. The end page number 704 shows the number of the last page out of the plurality of successive pages forming the DB area 303.

The DB file 6a is stored in DB areas Aa1, Aa2, . . . in the example of FIG. 7. Each DB area 303 is formed of 1000 pages. The DB area Aa1 is formed of page 1 to page 1000 and the DB area Aa2 is formed of page 1001 to page 2000.

FIG. 8 illustrates a configuration example of the thread management table 502.

The thread management table 502 shows the correspondence relationship of the pseudo thread, the OS thread 304, the CPU 201, the core 211, the type, and the shared resource part (the log buffer 214, the log file 107, the DB file 106, and the DB area 303). For example, the thread management table 502 includes an entry for each pseudo thread. Each entry stores a core number 801, an OS thread number 802, a pseudo thread number 803, a type 804, a log buffer name 805, a log file name 806, a DB file name 807, and a DB area number 808 therein.

The core number 801 shows the number of the core 211 that executes the pseudo thread. The OS thread number 802 shows the number of the OS thread 304 including the pseudo thread. The pseudo thread number 803 shows the number of the pseudo thread. The type 804 shows the type 804 of the pseudo thread (for example, "reference" or "update"). The log buffer name 805 shows the name of the log buffer 214 allocated to the pseudo thread. The log file name 806 shows the name of the log file 107 allocated to the pseudo thread. The DB file name 807 shows the name of the DB file 106 stored in the DB area allocated to the pseudo thread. The DB area number 808 shows the number of the DB area 303 allocated to the pseudo thread.

In the example of FIG. 8, the OS thread T11a includes three reference threads U11a1 to U11a3 and one update thread U11a4. The OS thread T11a (the reference threads U11a1 to U11a3 and the update thread U11a4) is executed by the core C11. Three DB areas Aa1 to Aa3 are respectively allocated to the three reference threads U11a1 to U11a3. Thus, the reference thread U11a1 refers to the DB area Aa1 and does not refer to other DB areas 303. Three DB areas Aa1 to Aa3 referred by the OS thread T11a (the reference threads U11a1 to U11a3) are allocated to the update thread U11a4. The update thread U11a4 can update any of the DB areas Aa1 to Aa3, but does not update the DB areas 303 other than the DB areas Aa1 to Aa3. A log buffer B14a and a log file 7a are allocated to the update thread U11a4 (OS thread T11a). The update thread U11a4 can update the log buffer B14a and the log file 7a, but does not update the log buffers 214 other than the log buffer B14a and the log files 107 other than the log file 7a.

In the example of FIG. 8, for the same OS thread 304, one or more DB areas 303 allocated to the update thread 301 and one or more DB areas 303 respectively allocated to one or more reference threads 302 are the same. However, this does not always need to be the case and one or more DE areas 303 allocated to the update thread 301 and one or more DE areas 303 respectively allocated to one or more reference threads 302 can be partly or completely different for the same thread.

FIG. 9 illustrates a configuration example of the inter-thread data passing queue 503.

The inter-thread data passing queue 503 is a queue in which the data (update request) passed between the pseudo threads is stored. The inter-thread data passing queue 503 includes an entry for each data that is the passing target. Each entry stores a From thread number 901, a To thread number 902, and a record value 903.

The From thread number 901 shows the number of the pseudo thread that is the source. The To thread number 902 shows the number of the pseudo thread that is the destination. The record value 903 shows the value included in the data of the passing target (for example, the update request). For example, the record value 903 can include information for showing an update destination specified by the update request (for example, the address or the page number of the update destination), and the updated data (for example, data to be written in the page).

In the example of FIG. 9, a record value xxxx provided from the reference thread U11a1 to the update thread U11a4 is accumulated. The configuration exemplified in FIG. 9 can be a logical configuration and the inter-thread data passing queue 503 can logically be the plurality of queues 313 (see FIG. 3) that are independent for each update thread 301 (for each OS thread 304).

FIG. 10 illustrates a configuration example of the log file management table 506.

The log file management table 506 holds information on the log file 107. For example, the log file management table 506 includes an entry for each log file 107. Each entry stores a log file name 1001 and a state 1002 therein.

The log file name 1001 shows the name of the log file 107. The state 1002 shows the state of the log file 107 (for example, "in use" or "unused").

In the example of FIG. 10, the state of the log file 7a is "in use" (for example, a state in which the log file 7a is already allocated to any one of the update threads 301) and the state of the log file 7c is "unused" (for example, a state in which the log file 7c is not allocated to any of the update threads 301).

The processing performed in this embodiment is described below.

Figure 11:
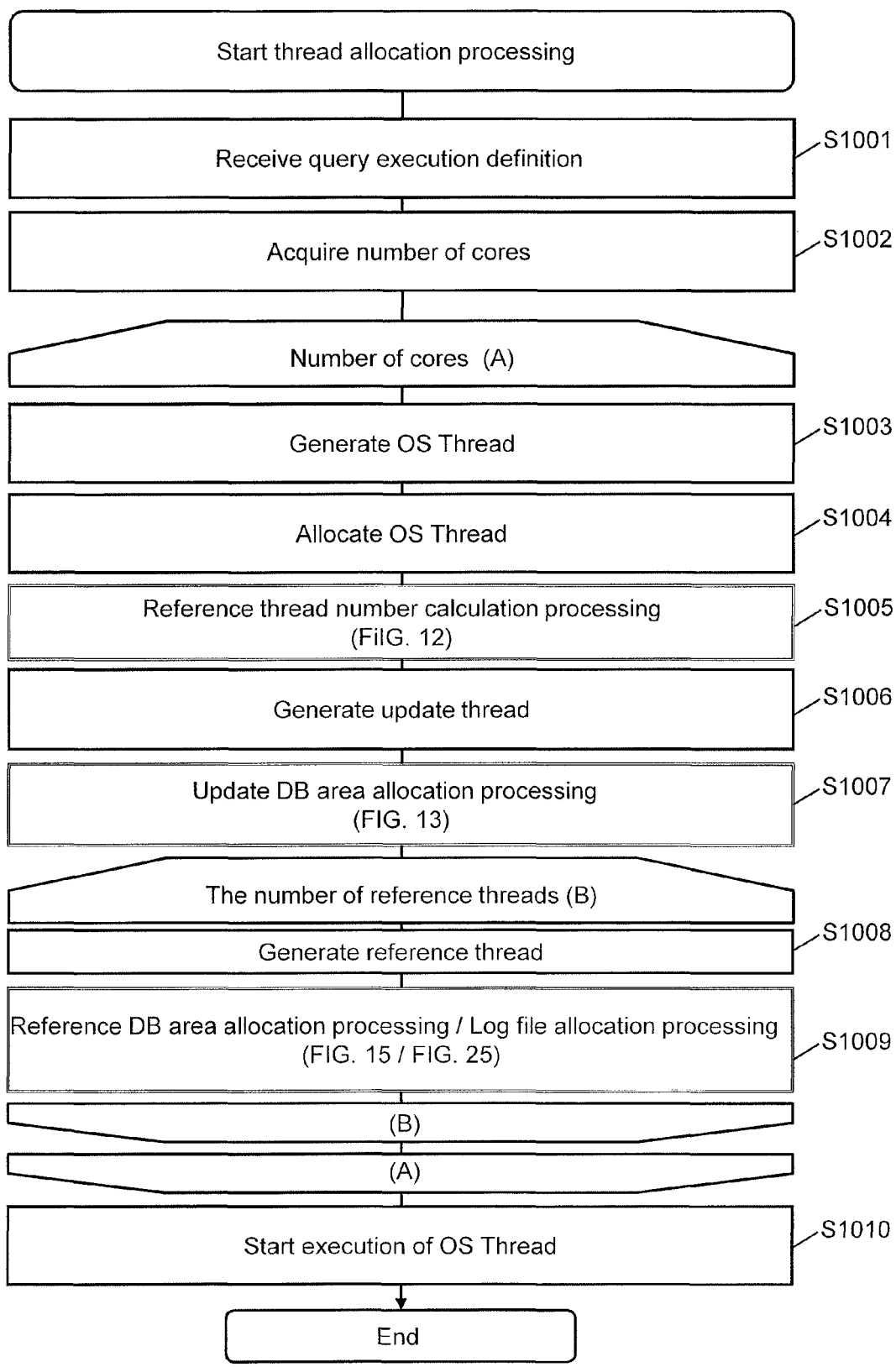
FIG. 11 illustrates an example of a flow of thread allocation processing.

FIG. 11 illustrates an example of a flow of thread allocation processing.

The thread allocation program 401 receives the query execution definition (S1001). The query execution definition can be a query in which the number of the reference threads 302 to be generated is defined by the SQL and the like. The number of reference threads 302 can be configured in advance through user input to be specified in the query. The number of reference threads 302 specified by the query execution definition can be the maximum number or the minimum number of the reference threads 302, for example.

The thread allocation program 401 acquires the number of the cores 211 of the host computer 101 from the system information obtained from the OS 218 of the host computer 101 (for example, information including information on the hardware configuration of the host computer 101) (S1002).

S1003 to S1009 are performed by the number of the acquired cores 211. In the below description, one core 211 (the core 211 corresponding to one of S1003 to S1009) is taken as an example and the core 211 is referred to as the "target core 211" in the description of FIG. 11 to FIG. 14 as a matter of convenience.

The thread allocation program 401 generates the OS thread 304 (real thread) (S1003) and allocates the generated OS thread 304 to the target core 211 (S1004). The core 211 to which the generated OS threads 304 is allocated can be determined by the OS 218 of the host computer 101.

The thread allocation program 401 performs reference thread number calculation processing (FIG. 12) (S1005). As a result, the number of reference threads 302 generated for the target core 211 (for the OS thread 304 executed by the target core 211) is calculated.

The thread allocation program 401 generates the update thread 301 for the target core 211 (for the OS thread 304 generated in S1003) (S1006). The thread allocation program 401 performs update DB area allocation processing (FIG. 13) and log file allocation processing (FIG. 25) (S1007). As a result, the DB area 303 and the log file 107 are allocated to the update thread 301 generated in S1006.

S1108 and S1009 are performed by the number of the reference threads calculated in S1005. That is, the thread allocation program 401 generates the reference thread 302 the target core 211 (S1008). Then, the thread allocation program 401 performs reference DB area allocation processing (S1009). As a result, the reference thread 302 generated in S1108 is allocated to the DB area 303.

Lastly, the thread allocation program 401 starts the execution of each of the OS threads 304 generated in the series of processing in FIG. 11 (S1010). Specifically, for example, the thread allocation program 401 notifies the OS 218 of the host computer 101 that the OS thread 304 has been generated, to thereby cause the OS 218 to start the execution of the OS thread 304.

Figure 12:
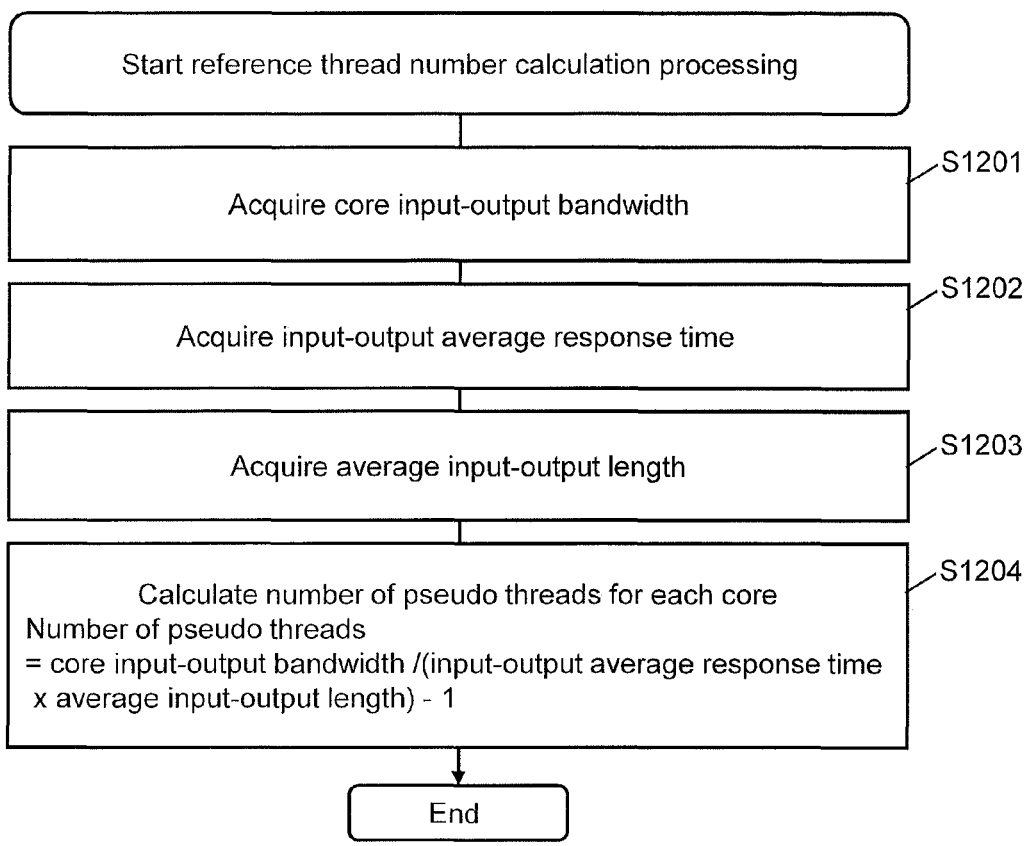
FIG. 12 illustrates an example of a flow of reference thread number calculation processing.

FIG. 12 illustrates an example of a flow of the reference thread number calculation processing.

The thread allocation program 401 acquires information for showing the input-output bandwidth of the core 211 from the OS 218 of the host computer 101 (S1201). The information acquired here can be information on each core 211 of the host computer 101 or can be information on the core 211 to which the OS thread 304 is allocated in S1004.

The thread allocation program 401 acquires information for showing the input-output average response time of the core 211 from the OS 218 of the host computer 101 (S1202). The information acquired here also can be information on each core 211 of the host computer 101 or can be information on the core 211 to which the OS thread 304 is allocated in S1004. The "response time" of the input and the output is the amount of time from when the core 211 issues the I/O request for the DB area 303 (or the log area) to when the core 211 receives a response to the I/O request. The maximum value or the minimum value of the response time in a predetermined period of time and the like can be used instead of the input-output average response time.

The thread allocation program 401 acquires information for showing the average input-output length of the core 211 from the OS 218 of the host computer 101 (S1203). The information acquired here also can be information on each core 211 of the host computer 101 or can be information on the core 211 to which the OS thread 304 is allocated in S1004. The "input-output length" is the length (size) of the data input and output in response to one request. The maximum value or the minimum value of the input-output length in a predetermined amount of time and the like can be used instead of the average input-output length.

Then, the thread allocation program 401 calculates the number of the reference threads for one core (S1204). Specifically, for example, the thread allocation program 401 calculates the number of the reference threads for one core by the following Expression (1).

$$\text{Number of reference threads} = \text{core input-output bandwidth (Hz)}/(\text{input-output average response time (h)} \times \text{average input-output length (byte)}) - 1 \quad (1)$$

Expression (1) is an example of a computation expression for the number of reference threads considered to make full use of the performance of the core 211 while avoiding overload of the core 211. In this example, the number of the reference threads for one core when one OS thread 304 is allocated to one core 211 is calculated. According to Expression (1), one of the plurality of pseudo threads in the OS thread 304 is the update thread 301 ("−1" in Expression (1)).

For example, when a number of n OS threads 304 are allocated to one core 211, the number of the reference threads for one OS thread can be calculated by Expression (2).

$$\text{Reference thread number} = \{\text{core input-output bandwidth (Hz)}/(\text{input-output average response time (h)} \times \text{average input-output length (byte)}) - n\}/n \quad (2)$$

Roughly speaking, the number of the reference threads for one core 211 (OS thread 304) can be obtained on the basis of the performance of the core 211 (for example, the core input-output bandwidth), the performance for one pseudo thread, and the number of the update threads.

The input-output average response time and the average input-output length can be periodically or nonperiodically updated by a monitor. As a result, the number of the reference threads is sometimes different due to the execution timing of the reference thread number calculation processing. As a result, the number of the reference threads can be uniform among the plurality of OS threads 304 or can be different among the plurality of OS threads 304. Not only the number of the update threads but also the number of the reference threads can be fixed. For example, the pseudo thread included in the OS thread 304 can always include a number of n update threads 301 (n is an integer equal to or larger than 1 and is a fixed value (for example, n=1)) and a number of m reference threads 302 (m is an integer equal to or larger than 1 and is a fixed value).

Figure 13:
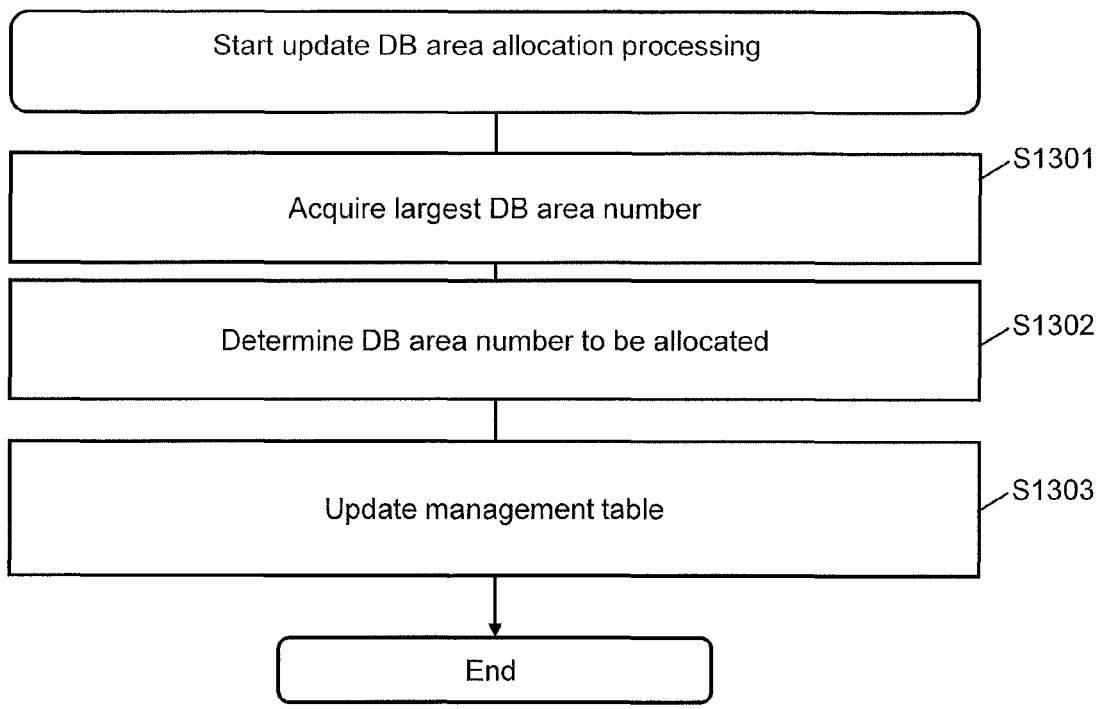
FIG. 13 illustrates an example of a flow of update DB area allocation processing.

FIG. 13 illustrates an example of a flow of the update DB area allocation processing.

The thread allocation program 401 invokes the resource allocation program, to thereby perform the update DB area allocation processing. In other words, the update DB area allocation processing is performed by the resource allocation program.

The resource allocation program refers to the thread management table 502 and acquires the largest DB area number 808 out of the DB area numbers 808 allocated to the update thread 301 (S1301).

The resource allocation program determines a number of N (N is an integer equal to or larger than 1) successive DB areas 303 including the DB area 303 next to the DB area 303 indicated by the DB area number 808 acquired in S1301 as the allocation targets of the update thread 301 (S1302). However, the resource allocation program can refer to at least one of the thread management table 502, the DB file management table 501, and the DB area-page correspondence management table 505 and perform the following for each of a number of N DB areas 303. That is, the resource allocation program adds the number of the pages forming the DB area 303 to the largest used page number 602 of the DB file 106 corresponding to the DB area number 808 acquired in S1301, and determines whether the page number after the addition exceeds the largest page number 603 of the DB file 106. When the result of the determination is negative, the resource allocation program determines the DB area 303 as one allocation target. When the result of the determination is positive, the resource allocation program determines the DB area 303 as a non-allocation target (in that case, the resource allocation program can determine the DB area 303 of another DB file 106 as the allocation target).

The resource allocation program updates at least one of the thread management table 502 and the DB file management table 501 in accordance with the result of S1302 (S1303). The resource allocation program registers, for the update thread 301, the number of the core 211 that executes the update thread 301, the number of the OS thread 304 including the update thread 301, the number of the update thread 301, the type "update", the number of the DB area 303 allocated to the update thread 301, and the name of the DB file 106 including the DB area 303 allocated to the update thread 301 into the entry of the thread management table 502, for example.

Figure 25:
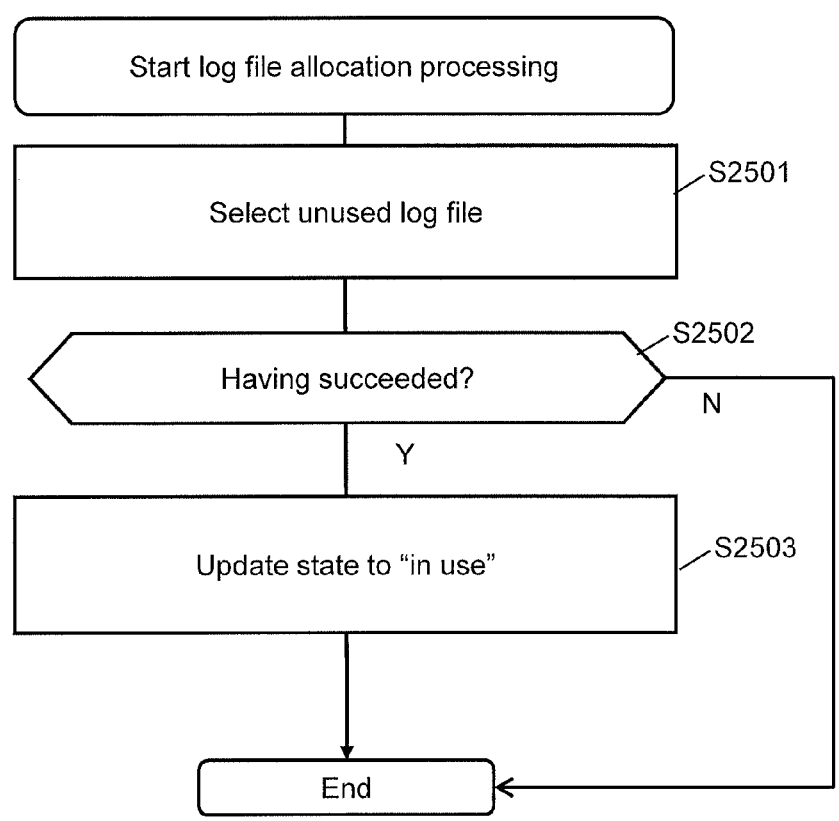
FIG. 25 illustrates an example of a flow of log file allocation processing.

FIG. 25 illustrates an example of a flow of the log file allocation processing.

The resource allocation program 402 reserves the free log buffer 214 and selects the log file 107 of which state 1002 is "unused" from the log file management table 506 (S2501).

When the reservation of the log buffer 214 and the selection of the log file 107 have succeeded (S2502: Y), the resource allocation program 402 updates the state 1002 corresponding to the selected log file 107 to "in use" and allocates the reserved log buffer 214 and the selected log file 107 to the update thread 301 generated in S1006 (S2503). In S2503, the resource allocation program 402 can register the name of the allocated log buffer 214 and the name of the allocated log file 107 into the entry corresponding to the update thread 301 (the entry of the thread management table 502). In S2503, the resource allocation program 402 can also allocate the common log file 307 and the common log buffer 314 to the update thread 301.

When at least one of the reservation of the log buffer 214 and the selection of the log file 107 has failed (S2502: N), the resource allocation program 402 ends the processing. That is, in this embodiment, the log file 107 and the log buffer 214 may not necessarily be allocated to all the update threads 301.

Figure 14:
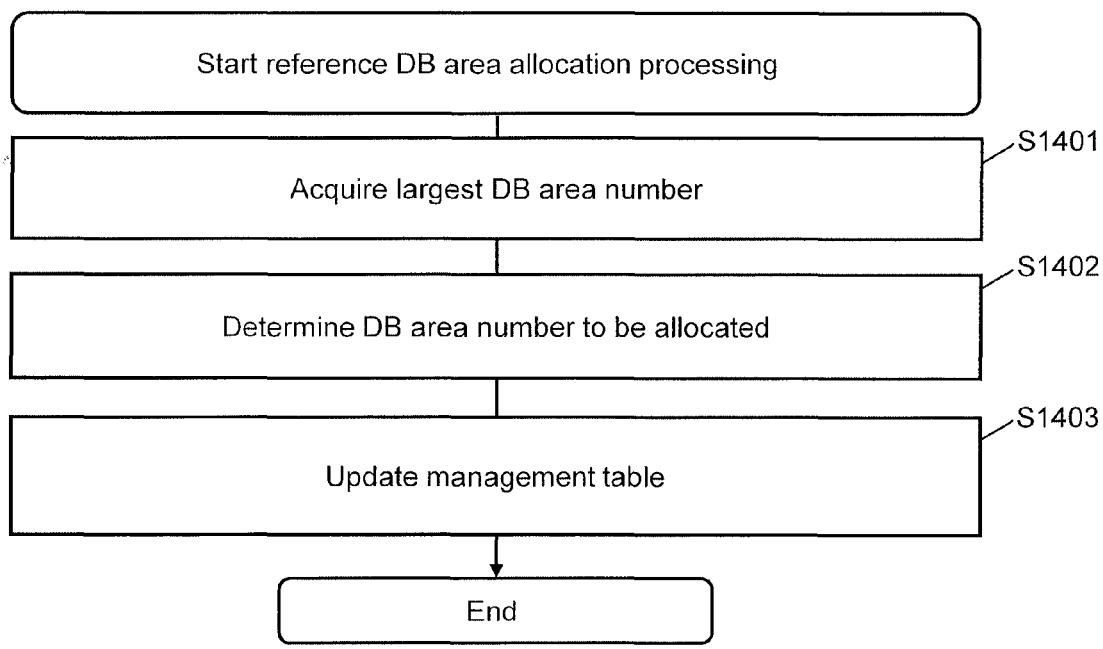
FIG. 14 illustrates an example of a flow of reference DB area allocation processing.

FIG. 14 illustrates an example of a flow of the reference DB area allocation processing.

The thread allocation program 401 invokes the resource allocation program 402, to thereby perform the reference DB area allocation processing. In other words, the reference DB area allocation processing is performed by the resource allocation program 402.

The resource allocation program 402 acquires the largest DB area number 808 out of the DB area numbers 808 allocated to the reference thread 302 from the thread management table 502 (S1401).

The resource allocation program 402 determines a number of M (M is an integer equal to or larger than 1 (M=1 in this case)) successive DB areas 303 including the DB area 303 next to the DB area 303 indicated by the DB area number 808 acquired in S1401 as the allocation target of the reference thread 302 (S1402). However, the resource allocation program 402 can refer to at least one of the thread management table 502, the DB file management table 501, and the DB area-page correspondence management table 505 and perform the following for each of the determined DB areas 303. That is, the resource allocation program 402 adds the number of the pages forming the DB area 303 to the largest used page number 602 of the DB file 106 corresponding to the DB area number 808 acquired in S1401, and determines whether the page number after the addition exceeds the largest page number 603 of the DB file 106. When the result of the determination is negative, the resource allocation program 402 determines the DB area 303 as one allocation target. When the result of the determination is positive, the resource allocation program 402 determines the DB area 303 as a non-allocation target (in that case, the resource allocation program 402 can determine the DB area 303 of another DB file 106 as the allocation target). Alternatively, the resource allocation program 402 can determine a number of N DB areas 303 allocated to the update thread 301 in the same OS thread 304 as the target to be allocated to the reference thread 302 by the number of calculated reference threads.

The resource allocation program 402 updates at least one of the thread management table 502 and the DB file management table 501 in accordance with the result of S1402. For example, the resource allocation program 402 registers the number of the core 211 that executes the reference thread 302, the number of the OS thread 304 including the reference thread 302, the number of the reference thread 302, the type "reference", the number of the DB area 303 allocated to the reference thread 302, and the name of the DB file 106 including the DB area 303 allocated to the reference thread 302 into the entry of the thread management table 502.

Figure 15:
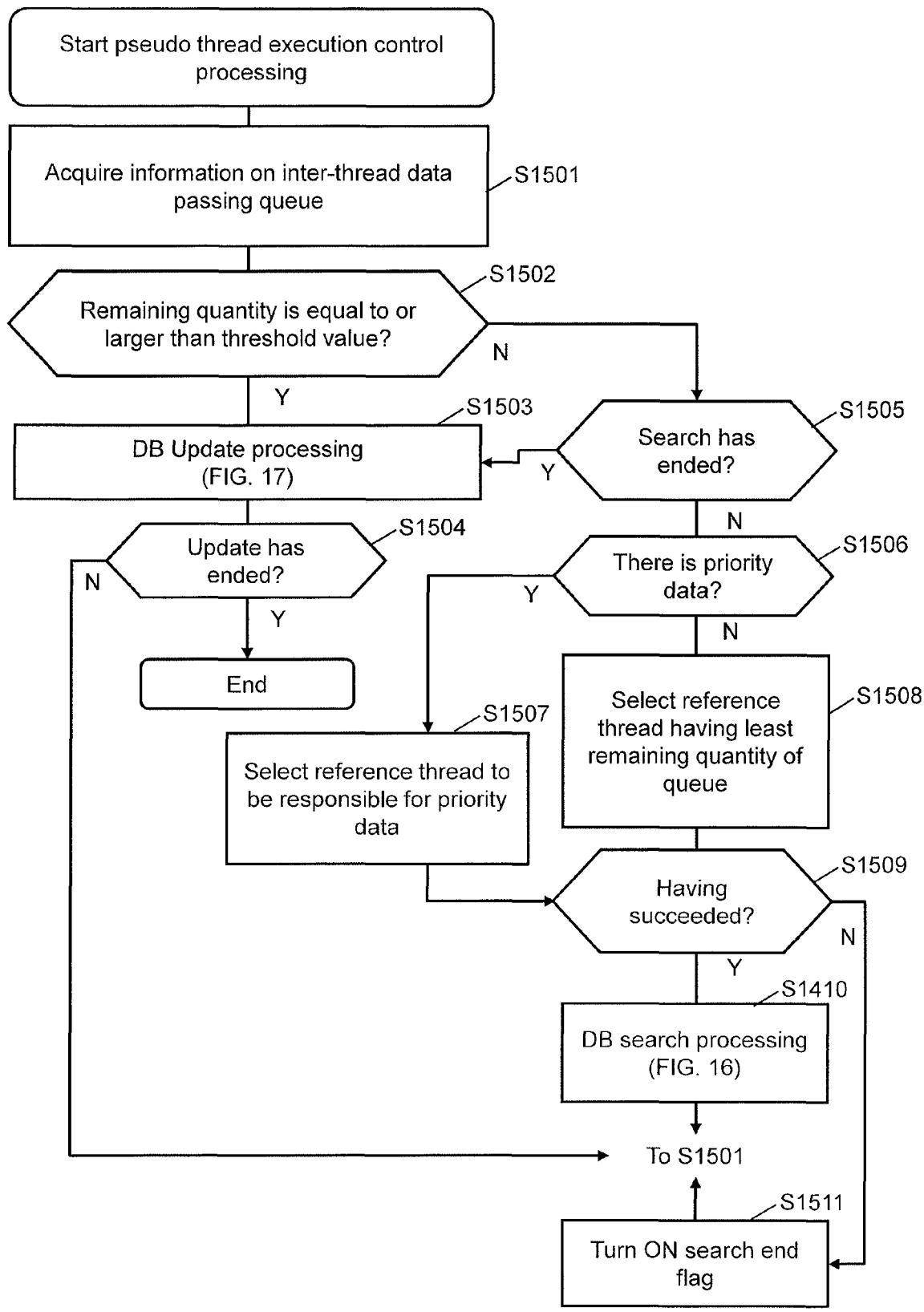
FIG. 15 illustrates an example of a flow of pseudo thread execution control processing.

FIG. 15 illustrates an example of a flow of pseudo thread execution control processing.

The pseudo thread execution control processing is, for example, processing that starts by S1110 in FIG. 11 and is performed by the pseudo thread execution control program 403. In the example of FIG. 15, the update thread 301 is executed when the queue 313 has data (update request) of an amount equal to or larger than a predetermined amount and the reference thread 302 is executed when the queue 313 does not have an amount of data equal to or larger than a predetermined amount. As described above, the update thread 301 and the reference thread 302 are respectively associated to predetermined DB areas 303, and hence the update processing or the reference processing (search processing) can be executed in parallel.

The pseudo thread execution control program 403 acquires the number of the OS thread 304 to be executed from the OS 218 of the host computer 101 and determines the queue 313 corresponding to the OS thread 304 (S1501). The pseudo thread execution control program 403 determines whether the remaining quantity of the queue 313 determined in S1501 is equal to or larger than a predetermined threshold value (S1502).

When the determination result of S1502 is positive (S1502: Y), the pseudo thread execution control program 403 executes DB update processing (FIG. 17) by invoking the DB update program 405 (S1503). As a result, the update thread 301 corresponding to the predetermined queue 313 is executed. That is, the update thread 301 writes the record value 903 in the queue 313 into the DB area 303 (or the log file 107) allocated to the update thread 301. The pseudo thread execution control program 403 determines whether the update processing ends (whether the search end flag is ON) (S1504). When the determination result of S1504 is negative (S1504: N), S1501 is performed, and when the determination result of S1504 is positive (S1504: Y), the processing ends.

When the determination result of S1502 is negative (S1502: N), the pseudo thread execution control program 403 determines whether the search processing by the reference thread 302 has ended (S1505). When the determination result of S1505 is positive (S1505: Y), the pseudo thread execution control program 403 performs S1503.

When the determination result of S1505 is negative (S1505: N), the pseudo thread execution control program 403 determines whether there is data to be preferentially searched (S1506).

When the determination result of S1506 is positive (S1506: Y), the pseudo thread execution control program 403 selects the reference thread 302 to be responsible for the search processing for priority data (S1507). When the determination result of S1506 is negative (S1506: N), the pseudo thread execution control program 403 selects the reference thread 302 having the least remaining quantity of the queue 313 among the reference threads 302 to which the DB area 303 is allocated (S1508).

After S1507 or S1508, the pseudo thread execution control program 403 determines whether the selection of the reference thread 302 has succeeded (S1509). When the determination result of S1509 is positive (S1509: Y), the pseudo thread execution control program 403 executes DB search processing (FIG. 16) by invoking the DB search program 404 (S1510). As a result, the selected reference thread 302 is executed. When the determination result of S1509 is negative (S1509: N), the pseudo thread execution control program 403 turns the search end flag ON (S1511) and executes S1501.

Figure 16:
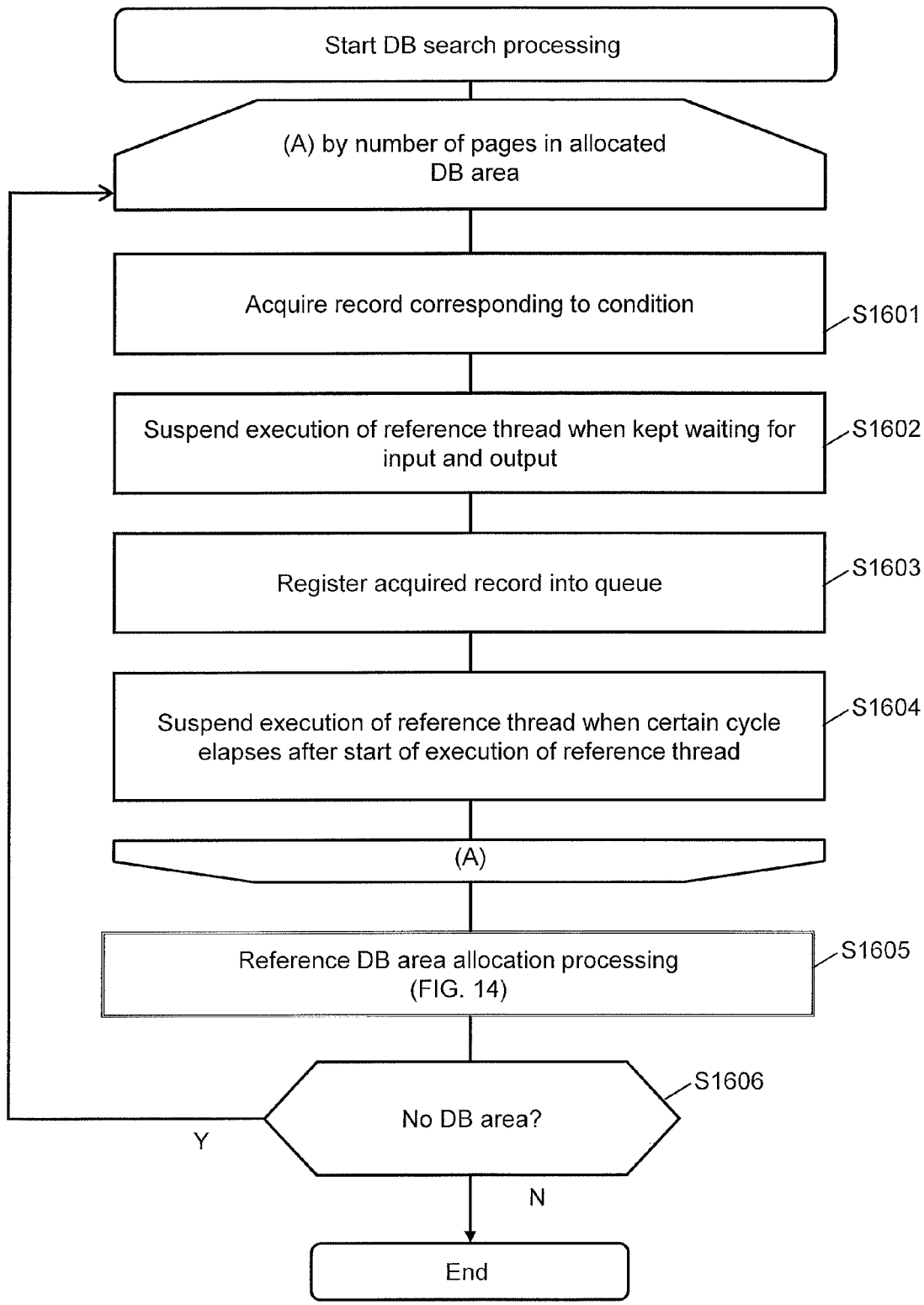
FIG. 16 illustrates an example of a flow of DB search processing.

FIG. 16 illustrates an example of a flow of the DB search processing.

The DB search program 404 repeats S1601 to S1604 by the number of the pages in the DB area 303 already allocated to the reference thread 302 that is the execution target (S1606).

That is, the DB search program 404 acquires a record meeting search conditions from the DB page of the DB area 303 allocated to the reference thread 302 that is the execution target (S1601). When the record acquired in S1601 is kept waiting for input and output, the DB search program 404 suspends the execution of the reference thread 302 (S1602). The DB search program 404 registers the record acquired in S1601 into the inter-thread data passing queue 503 (S1603). Specifically, for example, the DB search program 404 registers the number of the executed reference thread 302 as the From thread number 901, registers the number of the update thread 301 to be executed in the OS thread 304 that is the same as the reference thread 302 as the To thread number 902, and registers the record value 903 acquired in S1601 as the record value 903 into the entry of an inter-thread data passing queue 503313. The DB search program 404 suspends the execution of the reference thread 302 when a certain cycle elapses after the start of the execution of the reference thread 302 (S1604). By the suspension processing in S1604, it is possible to avoid executing search processing for one reference thread 302 for a long period of time in one OS thread 304, to thereby avoid the situation in which other reference threads 302 are not executed and the waiting state 1002 continues.

The DB search program 404 invokes the resource allocation program 402 and executes the reference DB area allocation processing (S1605). When there is a DB area allocated to the reference thread (S1606: Y), S1601 to S1604 are performed by the number of the allocated DB areas. When there are no DB areas allocated to the reference thread (S1606: N), the processing ends.

Figure 17:
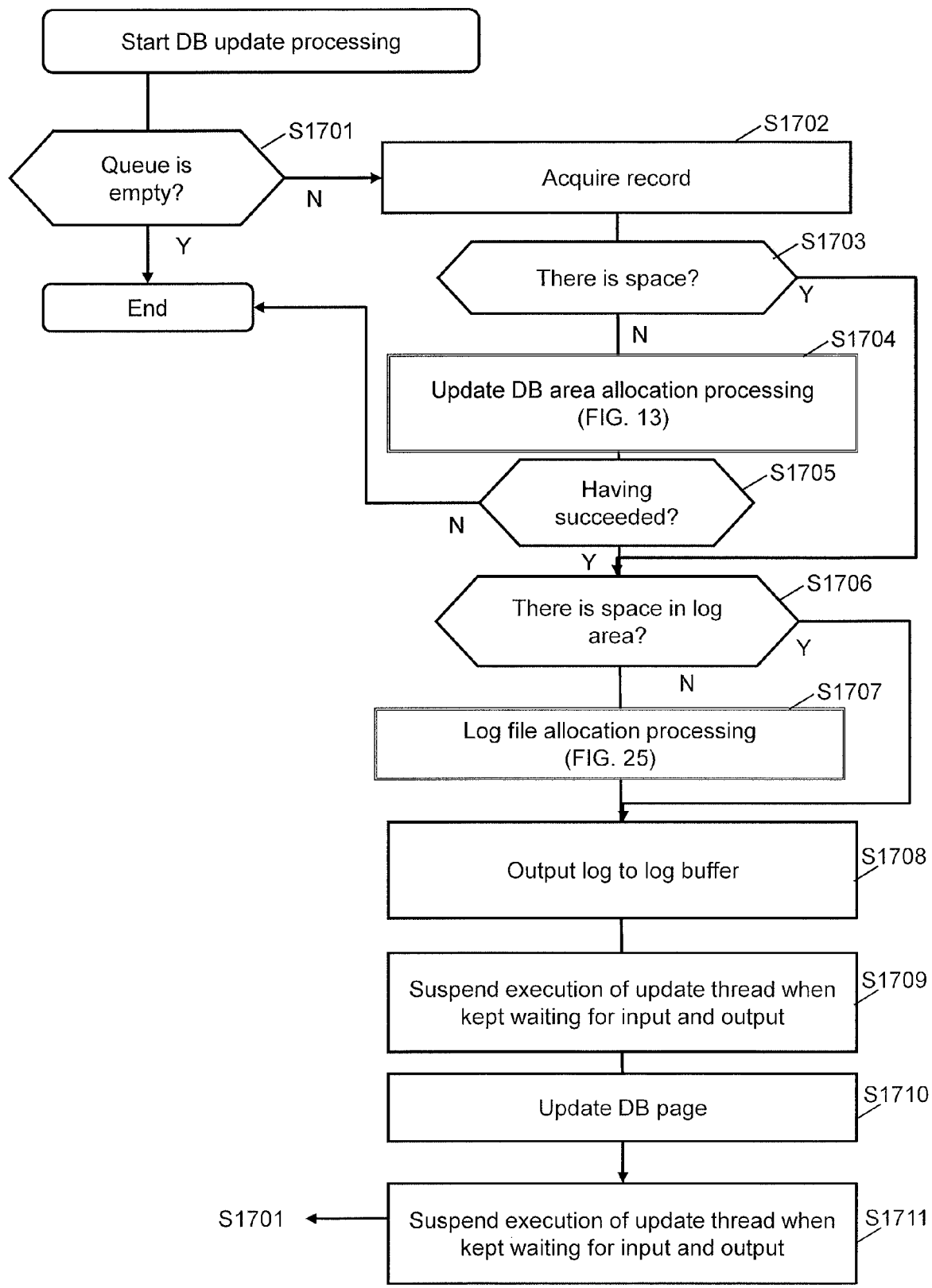
FIG. 17 illustrates an example of a flow of DB update processing.

FIG. 17 illustrates an example of a flow of the DB update processing.

The DB update processing is performed by the DB update program 405. The DB update processing is processing of updating data corresponding to the record value 903 of the queue 313 registered into the inter-thread data passing queue 503313 by the DB search processing described above.

The DB update program 405 determines whether the inter-thread data passing queue 503313 is empty (S1701). When the determination result of S1701 is positive (S1701: Y), the DB update program 405 ends the processing.

When the determination result of S1701 is negative (S1701: N), the DB update program 405 acquires a record from the inter-thread data passing queue 503 (S1702). The DB update program 405 determines whether there is a space in the DB area 303 allocated to the update thread 301 that is being executed (S1703). When the determination result of S1703 is positive (S1703: Y), the DB update program 405 executes S1706.

When the determination result of S1703 is negative (S1703: N), the DB update program 405 invokes the resource allocation program 402 and executes the update DB area allocation processing (FIG. 13) (S1704). As a result, a new DB area 303 is allocated to the update thread 301. When the allocation processing of S1704 has succeeded (S1705: Y), the DB update program 405 executes S1706. When the allocation processing of S1704 has failed (S1705: N), the DB update program 405 ends the processing.

In S1706, the DB update program 405 determines whether there is a space in the log area of the log file 107 allocated to the executed update thread 301. When the determination result of S1706 is positive (S1706: Y), the DB update program 405 executes S1708. When the determination result of S1706 is negative (S1706: N), the DB update program 405 invokes the resource allocation program 402 and executes the log file allocation processing (FIG. 25) (S1707). As a result, a new log file 107 is allocated to the update thread 301.

The DB update program 405 outputs a log (for example, a logical log) to the log file 107 allocated to the update thread 301 (S1708). At that time, the DB update program 405 can output a log (for example, a physical log including data of a page before update) to the common log file 307. The DB update program 405 suspends the execution of the update thread 301 when the output processing of the log to the log file 107 is kept waiting for input and output (S1709).

Next, the DB update program 405 updates the DB page in the DB area 303 allocated to the update thread 301 (S1710). S1710 can be performed at least at the time of the commit. That is, the updated data can be immediately written in the DB page at the time of the commit. The DB update program 405 suspends the execution of the update thread 301 when the output processing to the DB file 106 that is the update target is kept waiting for input and output (S1711). The DB update program 405 executes S1701 again after the update of the DB file 106 that is the update target has ended.

The example of the processing performed in this embodiment has been described above.

Figure 18:
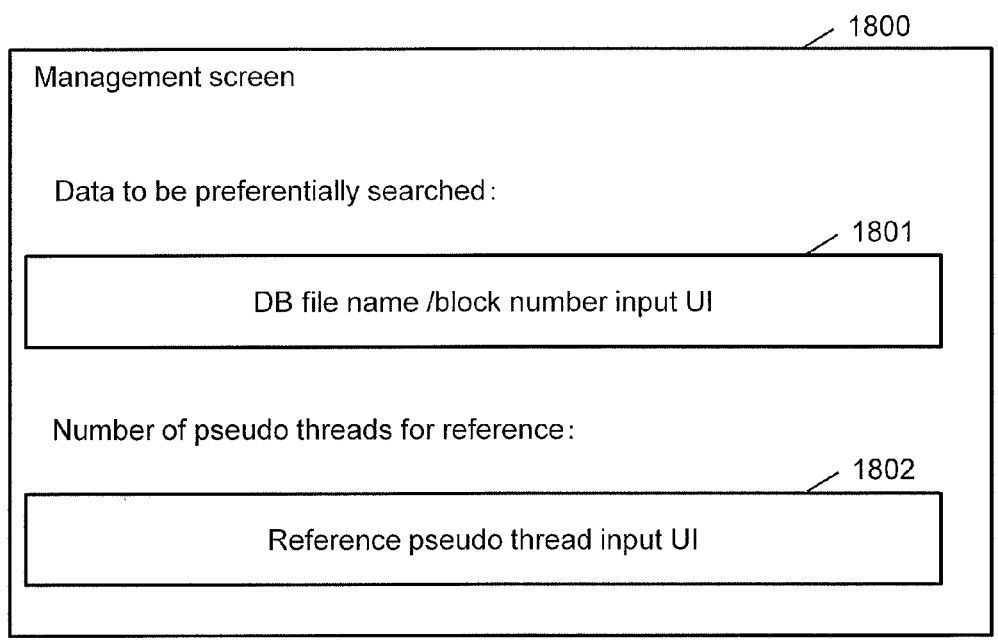
FIG. 18 illustrates an example of a management screen.

In this embodiment, the CPU 201 of the management terminal 108 (or the CPU 201 of the host computer 101) can display a management screen exemplified in FIG. 18. The management screen exemplified in FIG. 18 is a GUI (Graphical User Interface) that receives the data to be preferentially searched and the number of the reference threads. Specifically, for example, the management screen includes a UI (User Interface) that receives an input of an attribute of the data to be preferentially searched, and a UI that receives an input of the number of reference threads to be generated. The information input through those UIs can be configured in the memory 202 of the host computer 101 via or not via the management terminal 108 and the determination of the presence of the priority data (S1506), the calculation of the number of the reference threads 302 to be generated (S1105), and the like can be controlled on the basis of the information.

In the above description, in the update DB area allocation processing, different DB areas 303 are allocated to different update threads 301 and the allocation is in accordance with the first allocation mode as described above. In this embodiment, a plurality of allocation modes including the first allocation mode are prepared. In the update DB area allocation processing or other processing, the allocation mode selected from the plurality of allocation modes can be applied to the area allocation for the update thread 301. The selection of the allocation mode can be manually performed by the user of the management terminal 108 or the host computer 101 or can be automatically performed by the database management program 215 in accordance with a configured policy. For example, the thread allocation program 401 can perform allocation mode selection processing whenever a predetermined event such as the reception of a query is detected. The allocation mode selection processing can be performed in S1002 in FIG. 11, for example. In the allocation mode selection processing, the thread allocation program 401 can perform the following.

(A1) The thread allocation program 401 refers to the DB statistical information 504 and determines attributes such as the configuration of each of the index and the DB table.

(A2) When it is determined that the index is a B-tree structure in (A1), the thread allocation program 401 selects a second allocation mode described later for that index.

(A3) When it is determined that the index is not a B-tree structure in (A1), the thread allocation program 401 selects any one of the allocation modes (for example, the first allocation mode) other than the second allocation mode described later for that index.

(A4) When the variation in the number of duplication of the keys is relatively large for the DB table in (A1), the thread allocation program 401 selects a fourth allocation mode described later for that DB table.

(A5) When the variation in the number of duplication of the keys is relatively small for the DB table in (A1), the thread allocation program 401 selects the first allocation mode or a third allocation mode described later for that DB table.

Several allocation modes other than the first allocation mode are described below. Different shared resource parts are allocated to the update thread 301. However, one update thread 301 is allocated to one OS thread 304 in this embodiment, and hence allocation to update thread 301 is described as allocation to the OS thread 304 in the below description.

Figure 19:
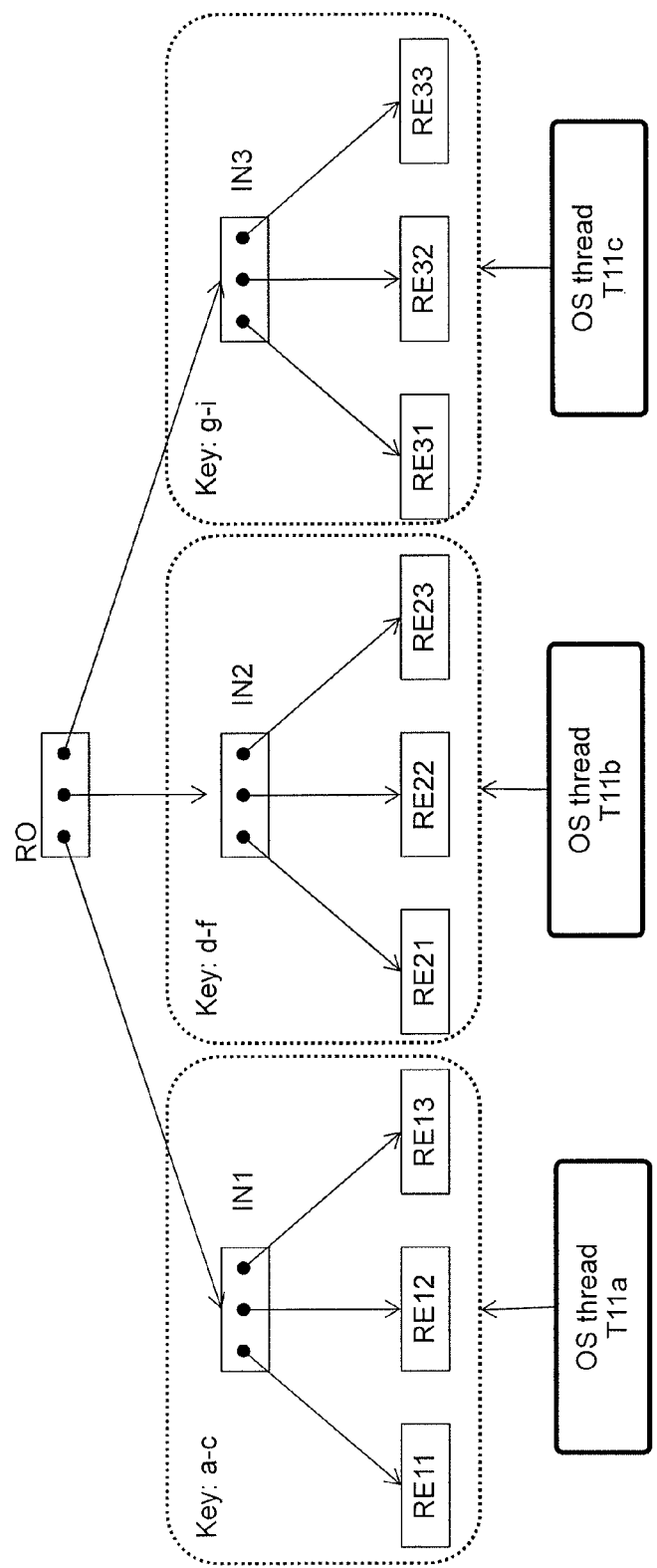
FIG. 19 is a schematic view illustrating an example of an allocation result obtained when a second allocation mode is employed.

FIG. 19 is a schematic view illustrating an example of an allocation result obtained when the second allocation mode is employed.

In the second allocation mode, the DB area 303 is allocated to the OS thread 304 on the basis of the B-tree structure of the plurality of DB pages corresponding to the index and the table.

In the B-tree structure, the types 804 of the page include a root page (RO) that is the first page, a leaf page (RE) that is the last page, and an intermediate page (IN) that is a page between the root page and the leaf page. In the example of FIG. 19, the B-tree structure includes three tiers. The three tiers are formed of an upper layer to which the root page belongs, an intermediate layer to which the intermediate page belongs, and a lower layer to which the leaf page belongs. In this embodiment, when the number of the pages increases, the number of the leaf pages and the intermediate pages increases, and hence the three tiers are retained. However, this embodiment is not limited thereto and the B-tree structure can include four or more layers, for example. In that case, there are an intermediate page in a relatively upper level and an intermediate page in a relatively lower level. In other words, pages other than the root page and the leaf page are intermediate pages.

In the root page, one or more entries, in each of which a pointer for the intermediate page in a tier lower than the tier of the root page by one tier is associated with the maximum value of a key that is the management target of the page in the tier lower than the tier of the root page by one tier, are provided. Similarly, in the intermediate page, one or more entries, in each of which a pointer for page in a tier lower than the tier of the intermediate page by one tier is associated with the maximum value of a key that is the management target of the intermediate page in the tier lower than the tier of the intermediate page by one tier, are provided. In the leaf page, one or more rows (records), in each of which a key is associated with a storage position of a value corresponding to the key (for example, a page number in a Part table and a slot number in the page), are stored.

In the second allocation mode, different page sets are respectively allocated to different OS threads 304 (the page set is allocated to the OS thread 304 at a ratio of 1:1 or 1:n) by the database management program 215 (for example, the resource allocation program 402) with accordance with the B-tree structure as described above. That is, in the second allocation mode, the page set is an example of the shared resource part and the page set is allocated to the OS thread 304 instead of the DB area 303. One page set is a set of one or more intermediate pages and a plurality of leaf pages belonging to the one or more intermediate pages. In the example of FIG. 19, a first page set (an intermediate page IN1 and leaf pages RE11 to RE13 belonging thereto) is allocated to the OS thread T11a, and a second page set (an intermediate page IN2 and leaf pages RE21 to RE23 belonging thereto) is allocated to an OS thread T11b. The page sets do not overlap with other page sets.

Through those allocations, even if different leaf pages belonging to the same intermediate page are updated, a conflict in which different update threads 301 access the same intermediate page can be prevented. Each of the different page sets described above can be the DB area 303.

Figure 20:
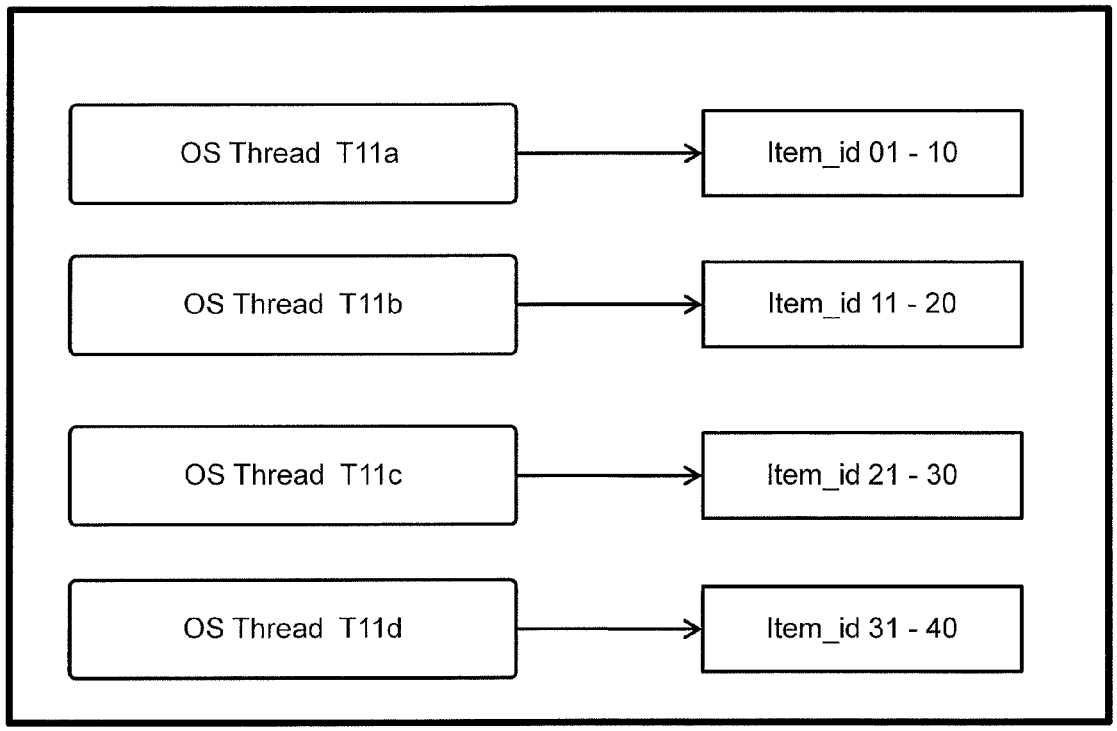
FIG. 20 is a schematic view illustrating an example of an allocation result obtained when a third allocation mode is employed.

FIG. 20 is a schematic view illustrating an example of an allocation result obtained when the third allocation mode is employed.

In the third allocation mode, different key ranges are respectively allocated to different OS threads 304 (the key range is allocated to the OS thread 304 at a ratio of 1:1 or 1:n) by the database management program 215. That is, in the third allocation mode, the key range is an example of the shared resource part and the key range is allocated to the OS thread 304 instead of the DB area 303. The key ranges do not overlap with each other. In the example of FIG. 20, a first key range (keys 01 to 10) are allocated to the OS thread T11a and a second key range (keys 11 to 20) are allocated to the OS thread T11b.

According to the third allocation mode, a conflict in which different update threads 301 access an area including the same key can be avoided.

Figure 21:
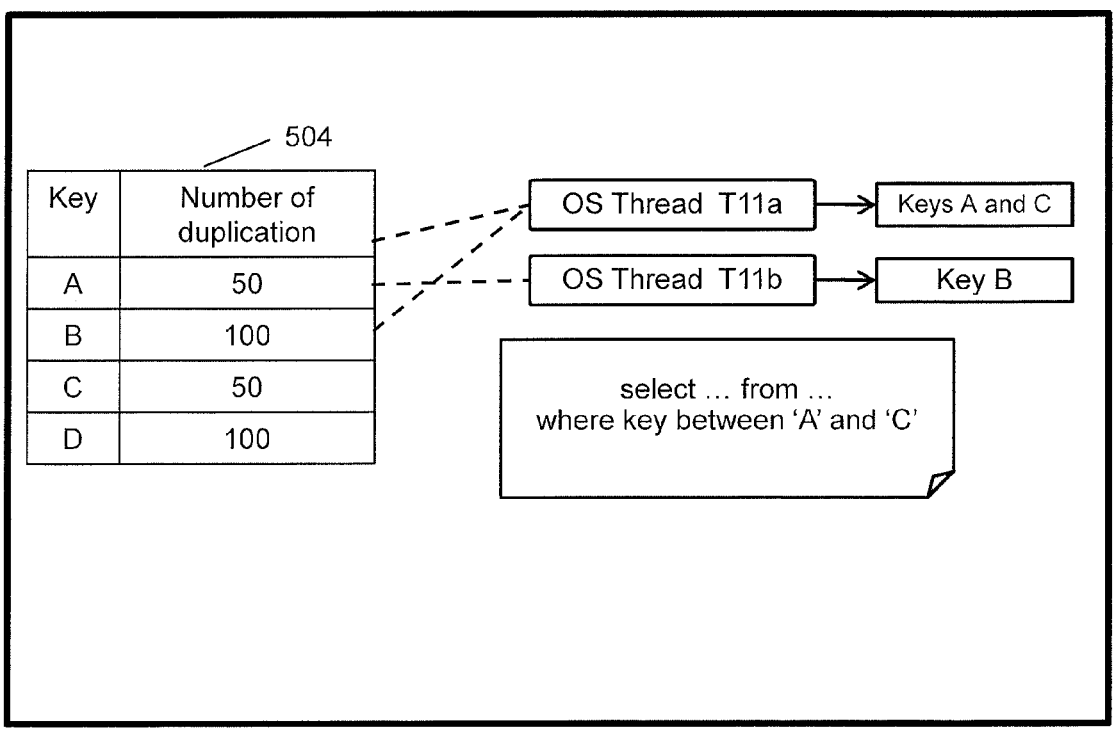
FIG. 21 is a schematic view illustrating an example of an allocation result obtained when a fourth allocation mode is employed.

FIG. 21 is a schematic view illustrating an example of an allocation result obtained when the fourth allocation mode is employed.

In the fourth allocation mode, different key sets are respectively allocated to different OS threads 304 (the key set is allocated to the OS thread 304 at a ratio of 1:1 or 1:n) by the database management program 215 on the basis of the DB statistical information 504 and the search condition. That is, in the fourth allocation mode, the key set is an example of the shared resource part and the key set is allocated to the OS thread 304 instead of the DB area 303. The DB statistical information 504 includes the number of duplication for each key. The number of duplication is the number of values belonging to the key. Each key set is one or more keys. Each key set is configured such that the plurality of key sets have the same total number of duplication as much as possible. The total number of duplication of a set of the queues 313 is the total number of duplication corresponding to the key included in the key set. The total number of duplication is calculated by the database management program 215, for example, and the set of the queues 313 is also defined by the database management program 215, for example. In the example of FIG. 21, a first key set (keys A and C) is allocated to the OS thread T11a and a second key set (key B) is allocated to the OS thread T11b.

According to the fourth allocation mode, a conflict in which different update threads 301 access an area including the same key can be avoided and the loads (processing amounts) of the update threads 301 can be approximately the same.

In this embodiment, when the update of the database has failed, for example, rollback processing is performed by the DB rollback program 406. In the rollback processing, an uncommitted physical log (a log including a page before the update) is reflected in the database first, and then a plurality of logical logs are reflected in the database in parallel. The plurality of different update threads 301 are respectively allocated to the plurality of different logical logs, and the plurality of update threads 301 reflect the plurality of logical logs into the database in parallel.

Figure 22:
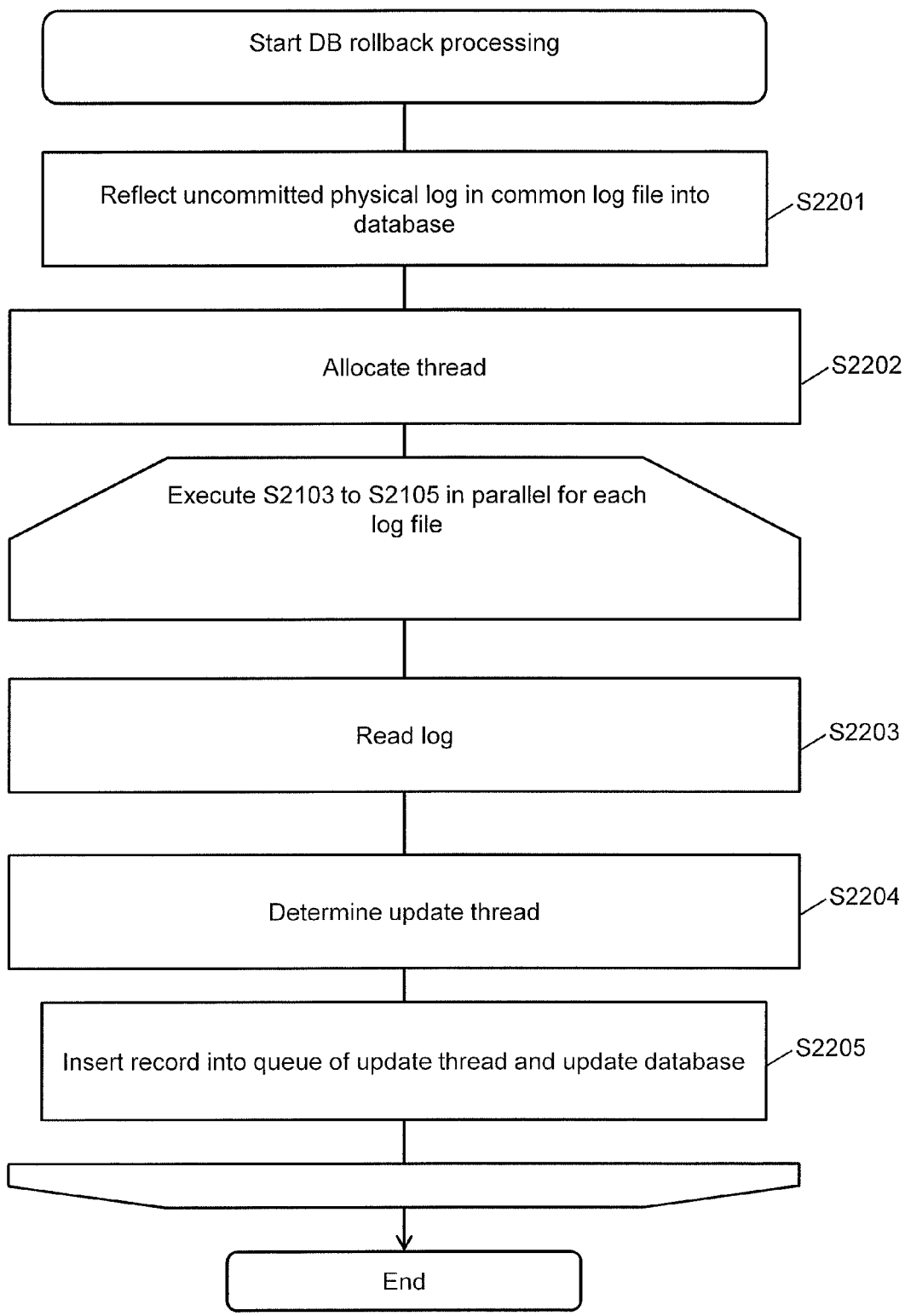
FIG. 22 illustrates an example of a flow of rollback processing.

FIG. 22 illustrates an example of a flow of the rollback processing.

The DB rollback program 406 reads the uncommitted physical log from the common log file 307 and reflects the read physical log into the database (S2201). The physical log includes a page before the update (the data before the update), and hence the content of the database is a content before the start of the transaction.

The DB rollback program 406 allocates one or more cores 211 to one or more OS threads 304 that perform the recovery of the database. The DB rollback program 406 allocates one or more log files 107 to one or more reference threads 302 and one or more update threads 301 (S2202). Different cores 211 are allocated to different OS threads 304 at a ratio of 1:1 or 1:n. Different log files 107 are allocated to different update threads 301 and different reference threads 302 at a ratio of 1:1 or 1:n. Specifically, for example, the DB rollback program 406 is invoked, to thereby cause the thread allocation program 401 to execute the generation of the OS thread 304, the generation of the reference thread 302 and the update thread 301 for the OS thread 304, the allocation of the generated OS thread 304 to the core 211, and the allocation of the OS thread 304 (the reference thread 302 and the update thread 301) to the log file 107. The log file 107 allocated here is the log file 107 in use. This is because the log file 107 in use includes a logical log to be reflected and the unused log file 107 does not include that kind of logical log.

The DB rollback program 406 executes threads for one or more log files 107 in parallel in S2202. As a result, S2203 to S2205 are performed for each of one or more log files 107. When one log file 107 is taken as an example, the following is performed. That is, the reference thread 302 allocated to the log file 107 reads a logical log from the allocated log file 107 (S2203), determines the update thread 301 corresponding to the update destination in accordance with that logical log (S2204), and stores a request of the update in accordance with the logical log (a request specifying the update destination page and the update content) into the queue 313 corresponding to the determined update thread 301 (S2205). In accordance with the update request in the queue 313, the update thread 301 updates the update destination page determined from the update request.

In the rollback processing, the OS thread 304 is allocated to the log file 107 and the core 211. The log file 107 is the log file 107 allocated at a ratio of 1:1 to the update thread 301 to which one or more DB areas 303 are allocated, and hence the update destination page (for example, the page number or the logical address of the page) indicated by the logical log stored in the log file 107 is one of one or more DB areas 303 allocated to the update thread 301. As a result, when the log file 107 is allocated to the OS thread 304 (reference thread 302) in the rollback processing, a conflict in which the plurality of OS threads 304 (update threads 301) operating in parallel updates the same DB area 303 does not occur in the rollback processing even if the DB area 303 is not allocated to the OS thread 304 (update thread 301).

In this embodiment, the CPU 201 of the management terminal 108 (or the CPU 201 of the host computer 101) can display a management screen exemplified in FIG. 23 or FIG. 24. A management screen 2300 exemplified in FIG. 23 shows a list of the correspondence relationship of the OS thread number and the log file name allocated to the OS thread 304. A management screen 2400 exemplified in FIG. 24 shows the correspondence relationship of the OS thread number, the log file name, and the output throughput (input and output data size per unit time). The display of the correspondence relationship of the OS thread number and the log file name can be the display of the correspondence relationship determined by referring to the thread management table 502, for example. The output throughput can be information monitored by the database management program 215 and recorded in the management data 216 (for example, the thread management table 502), for example. The display of the correspondence relationship of the OS thread number, the log file name, and the output throughput can also be the display of the correspondence relationship determined by referring to the thread management table 502, for example. The correspondence relationship between the core, the OS thread, the reference thread, the update thread, and the shared resource part (for example, at least one of the DB file, the DB area, the DB page, the log file, the log area, and the log buffer) can be displayed as the displayed correspondence relationship on the basis of the thread management table 502 and the like instead or in addition to the relationship exemplified in FIG. 23 or FIG. 24. Specifically, for example, the database management program 215 can display the correspondence relationship between the core, the OS thread, the reference thread, the update thread, and the shared resource part (for example, at least one of the DB file, the DB area, the DB page, the log file, the log area, and the log buffer) or output information for displaying the correspondence relationship (for example, information including the thread management table 502) to external apparatuses such as the management terminal 108.

One embodiment has been described above, but this embodiment is an example for describing this invention and it is not intended to limit the scope of this invention only to this embodiment. This invention can be embodied in other various forms.

For example, in the host computer 101, one or a plurality of VMs (virtual machines) can be generated through execution of a hypervisor and the database management program 215 can be executed in each VM. In an embodiment in which the VM is executed, for example, the above description can be replaced with the following. That is, for example, in FIG. 1, a virtual volume (a disk image of the VM) can be placed on the logical volume 105 and the DB file 106 can be generated on the virtual volume. The OS 218 can be replaced with a guest OS (the OS of the VM) executed on a host OS (the OS of the host computer 101). The DB buffer 213, the log buffer 214, the database management program 215, the management data 216, and the thread state 217 can be placed on the guest OS. The OS thread can be replaced with a guest OS thread. The core 211 can be replaced with a virtual core of the VM (a core allocated to the VM).

REFERENCE SIGNS LIST

101 Host computer
102 Storage apparatus

The invention claimed is:
1. A shared resource update apparatus, comprising:
a processor having a plurality of processor cores configured to respectively execute a plurality of threads; and
a memory, communicatively coupled to the processor and configured to store a program that executes conflict avoidance control by being executed by the processor, wherein
a shared resource for the plurality of threads comprises a plurality of shared resource parts which are logically or physically partitioned,
each of two or more first threads among the plurality of threads is an update thread and the processor is configured to update an allocated shared resource part in response to an update request,
each of two or more second threads among the plurality of threads is a reference thread and the processor is configured to issue an update request and reference a shared resource part, and
the conflict avoidance control includes the allocation of different shared resource parts to different update threads at a ratio of 1:n or 1:1 (where n is an integer equal to or larger than 2).

2. The shared resource update apparatus according to claim 1, wherein
there are two or more database areas (DB areas) in which a database file (DB file) of a database is stored,
each of the DB areas is formed of a plurality of database pages (DB pages),
input and output of data is performed in units of DB pages,
the plurality of shared resource parts include a plurality of database areas (DB areas), a plurality of log buffers, and a plurality of log files,
different DB areas are allocated to different update threads at a ratio of 1:1 or 1:n,
different log buffers are allocated to different update threads at a ratio of 1:1 or 1:n, and
different log files are allocated to different update threads at a ratio of 1:1 or 1:n.

3. The shared resource update apparatus according to claim 2, wherein
the processor is configured to execute an operating system (OS) and a database management program,
there are a plurality of OS threads managed by the OS,
the plurality of OS threads each include two or more pseudo threads managed by the database management program,
the two or more pseudo threads are one or more reference threads and one or more update threads,
there is a common log file accessible from any of the update threads,
a physical log is to be written in the common log file by the update thread,
a logical log is to be written in each of different log files allocated to different update threads at a ratio of 1:1 or 1:n by the update thread, and
the processor is configured to execute rollback processing of the database, and
the rollback processing includes:
reflecting an uncommitted physical log from the common log file in the database;
allocating a log file to each of the plurality of OS threads at a ratio of 1:1 or 1:n; and
reflecting a plurality of logical logs in the plurality of log files in the database in parallel by executing the OS threads in parallel.

4. The shared resource update apparatus according to claim 2,
wherein different DB areas are allocated to different update threads at a ratio of 1:n,
different log buffers are allocated to different update threads at a ratio of 1:1, and
different log files are allocated to different update threads at a ratio of 1:1.

5. The shared resource update apparatus according to claim 1, wherein
the processor is configured to execute an operating system (OS) and a database management program,
there are a plurality of OS threads managed by the OS, the plurality of OS threads each include two or more pseudo threads managed by the database management program, and the two or more pseudo threads are one or more reference threads and one or more update threads.

6. The shared resource update apparatus according to claim 5, wherein each of one or more pseudo threads other than an update thread is a reference thread in each of the plurality of OS threads, the plurality of OS threads are respectively allocated to the plurality of processor cores, and the number of reference threads is calculated by the processor for each of the plurality of OS threads on the basis of a performance of one of the plurality of processor cores to which the OS thread is allocated, a performance for each of the one or more pseudo threads, and the number of update threads.

7. The shared resource update apparatus according to claim 5, wherein any of the reference threads in each of the plurality of OS threads is capable of issuing an update request for an update thread in any of the plurality of OS threads.

8. The shared resource update apparatus according to claim 1, wherein there are two or more database areas (DB areas) in which a database file (DB file) of a database is stored, each of the DB areas is formed of a plurality of database pages (DB pages), input and output of data is performed in units of DB pages, the plurality of DB pages form a B-tree structure and are formed of a root page, a plurality of leaf pages, and two or more intermediate pages between the root page and the plurality of leaf pages, the plurality of shared resource parts are a plurality of page sets that do not overlap with each other, each of the plurality of page sets is formed of one or more intermediate pages and two or more leaf pages belonging to the one or more intermediate pages, and different page sets are allocated to different update threads at a ratio of 1:1 or 1:n.

9. The shared resource update apparatus according to claim 1, wherein the plurality of shared resource parts are a plurality of key ranges which are present in the database and do not overlap with each other, and different key ranges are allocated to different update threads at a ratio of 1:1 or 1:n.

10. The shared resource update apparatus according to claim 1, wherein the memory is configured to store database statistical information, the database statistical information includes, for each key in the database, the number of duplication that is the number of values belonging to the key, the processor is configured to construct a plurality of key sets on the basis of the database statistical information and a search condition, such that the plurality of key sets have the same total number of duplication as much as possible, the plurality of key sets each include one or more keys, a total number of duplication of each of the plurality of key sets is a total number of duplication corresponding to the key that forms the key set, the plurality of shared resource parts are the plurality of key sets, and different key sets are allocated to different update threads at a ratio of 1:1 or 1:n.

11. The shared resource update apparatus according to claim 1, wherein the processor is configured to display a correspondence relationship between the plurality of processor cores, the reference thread, the update thread, and the shared resource part, or output information for displaying the correspondence relationship.

12. The shared resource update apparatus according to claim 1, wherein the processor is configured to execute a database management program, and each update thread is configured to write updated data into the database at the time of commit.

13. A shared resource update method, comprising:

executing conflict avoidance control including the allocation of different shared resource parts to different update threads at a ratio of 1:n or 1:1 (where n is an integer equal to or larger than 2) by a processor unit which includes at least one processor having a plurality of processor cores that respectively execute a plurality of threads; and executing a plurality of update threads in parallel by the plurality of processor cores, wherein a shared resource for the plurality of threads comprises a plurality of shared resource parts which are logically or physically partitioned, each of two or more first threads among the plurality of threads is an update thread which updates an allocated shared resource part in response to an update request, and each of two or more second threads among the plurality of threads is a reference thread which issues an update request and references a shared resource part.

* * * * *